United States Patent
Aarabi

(10) Patent No.: US 8,620,038 B2
(45) Date of Patent: Dec. 31, 2013

(54) METHOD, SYSTEM AND COMPUTER PROGRAM PRODUCT FOR AUTOMATIC AND SEMI-AUTOMATIC MODIFICATION OF DIGITAL IMAGES OF FACES

(76) Inventor: Parham Aarabi, Toronto (CA)

(*) Notice: Subject to any disclaimer, the term of this patent is extended or adjusted under 35 U.S.C. 154(b) by 0 days.

(21) Appl. No.: 13/570,494

(22) Filed: Aug. 9, 2012

(65) Prior Publication Data
US 2012/0299945 A1    Nov. 29, 2012

Related U.S. Application Data

(62) Division of application No. 12/090,677, filed as application No. PCT/CA2007/000784 on May 4, 2007, now Pat. No. 8,265,351.

(60) Provisional application No. 60/797,807, filed on May 5, 2006.

(51) Int. Cl.
*G06K 9/62*    (2006.01)

(52) U.S. Cl.
USPC ......................................................... 382/118

(58) Field of Classification Search
None
See application file for complete search history.

(56) References Cited

U.S. PATENT DOCUMENTS

| 7,587,083 B2* | 9/2009 | Tabata et al. | 382/162 |
| 7,660,482 B2* | 2/2010 | Huang et al. | 382/275 |
| 2003/0223635 A1* | 12/2003 | Russon et al. | 382/167 |

* cited by examiner

*Primary Examiner* — Brian P Werner
(74) *Attorney, Agent, or Firm* — Miller Thomson LLP; Eugene Gierczak

(57) ABSTRACT

The present invention is directed at modifying digital images of faces automatically or semi-automatically. In one aspect, a method of detecting faces in digital images and matching and replacing features within the digital images is provided. Techniques for blending, recoloring, shifting and resizing or portions of digital images are disclosed. In other aspects, methods of virtual "face lifts" are methods of detecting faces within digital image are provided. Advantageously, the detection and localization of faces and facial features, such as the eyes, nose, lips and hair, can be achieved on an automated or semi-automated basis. User feedback and adjustment enables fine tuning of modified images. A variety of systems for matching and replacing features within digital images is also provided, including implementation as a website, through mobile phones, handheld computers, or a kiosk. Related computer program products are also disclosed.

6 Claims, 21 Drawing Sheets

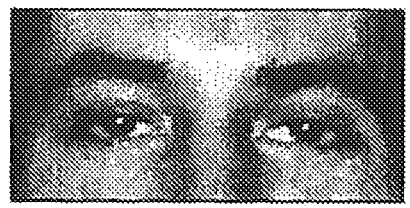 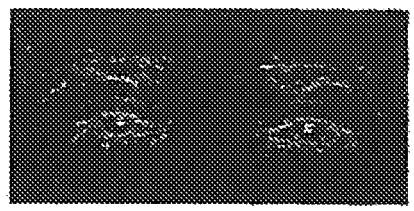
FIG. 6a   FIG. 6b
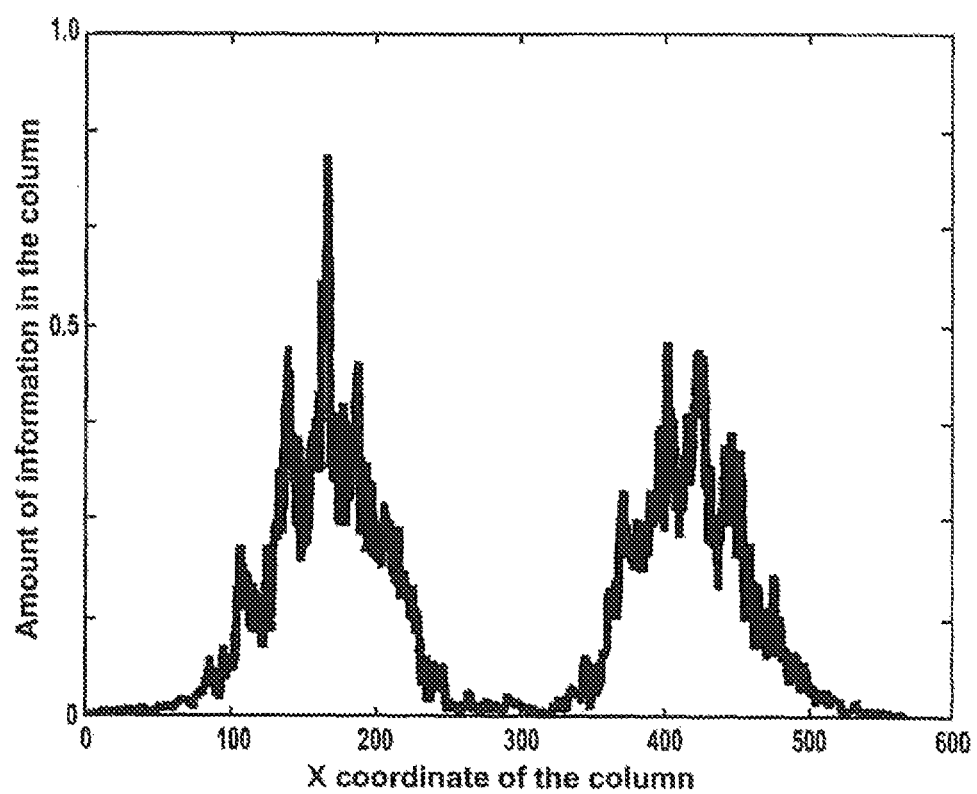
FIG. 6c

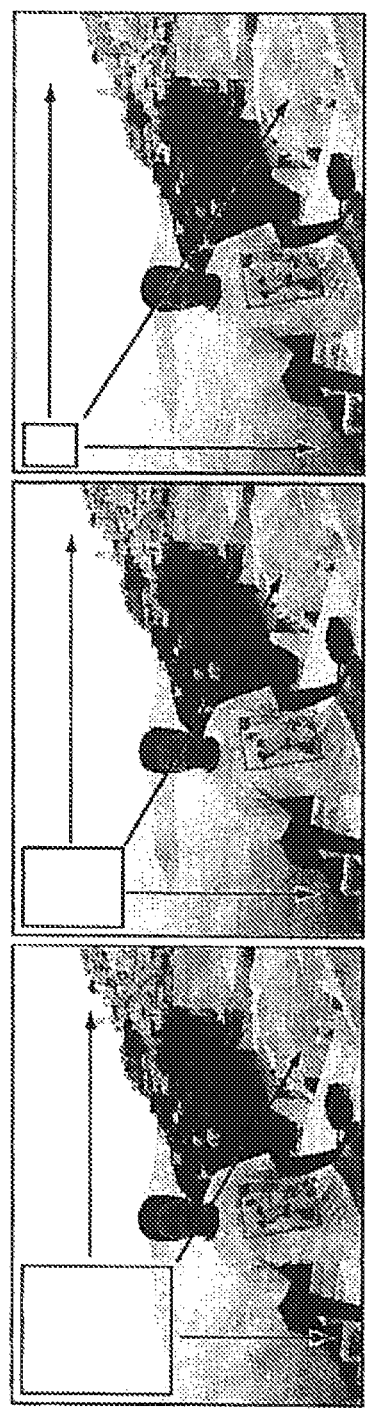

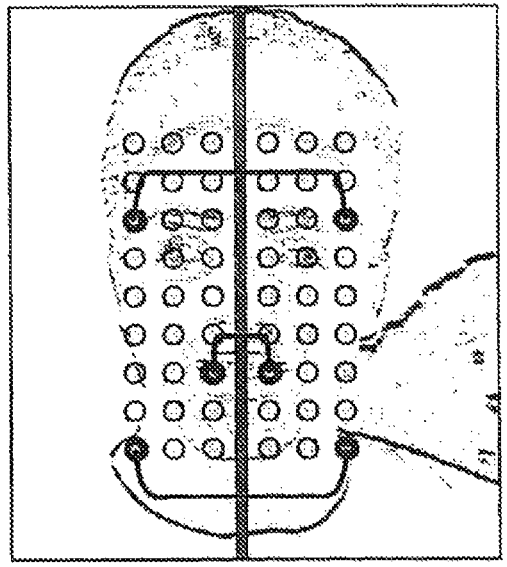
FIG. 12
 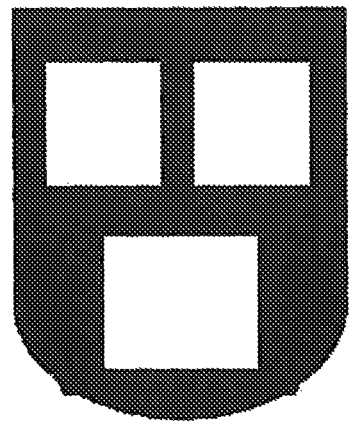
FIG. 13a　　　　　FIG. 13b

US 8,620,038 B2

METHOD, SYSTEM AND COMPUTER PROGRAM PRODUCT FOR AUTOMATIC AND SEMI-AUTOMATIC MODIFICATION OF DIGITAL IMAGES OF FACES

This application is a divisional application of U.S. patent application Ser. No. 12/090,677 filed on Apr. 18, 2008 now U.S. Pat. No. 8,265,351 as a national phase application based on PCI Application No. PCT/CA2007/000784 flied on May 4, 2007 which claims the benefit of U.S. Provisional Application No. 60/797,807 filed on May 5, 2006.

FIELD OF THE INVENTION

The present invention relates to methods and systems for automatically or semi-automatically manipulating and/or modifying digital images. The present invention more particularly relates to methods and systems for automatically or semi automatically manipulating and/or modifying digital images of human faces.

BACKGROUND OF THE INVENTION

While there has been significant work in face detection (see, for example, Nguyen, D., Halupka, D., Aarabi, P., Sbeikholcslami, A., "Real-time Face Localization Using Field Programmable Gate Arrays", *IEEE Transactions on Systems, Man, and Cybernetics*, Part B, Vol. 36, No. 4, pp. 902-912, August 2006), there seems to have been little work in the area of face modification, hair restyling and transforming, and "facelifting" for digital images.

Specifically, U.S. Pat. No. 6,293,284 to Rigg describes a method and apparatus utilizing manual user interaction it order to recolor the facial features and to simulate the effects of cosmetic products. Unfortunately, this approach does not utilize advanced image processing, computer vision or machine learning methodologies and does not simulate plastic surgery procedures such as facelifts. As such, a user has to spend significant time and effort in order to manually enter the parameters for the facial recoloring.

Virtual plastic surgery is the focus of U.S. Pat. Nos. 5,854,850 and 5,825,941 to ford et al. and U.S. Pat. No. 5,687,959 to Linford. However, the system disclosed in these references is relatively complicated and is intended to be an in-clinic system used by professional or experienced operators. Further, the system is not provided on the Internet or through mobile and wireless devices, and does not address utilization of advanced image processing, computer vision or machine learning methodologies for estimating the plastic surgery parameters. As a result, operators are required to manually adjust the system parameters in order to display the results of plastic surgery in a virtual fashion. This system is mostly manual, and does not utilize face localization, feature detection, facelifts, or feature/face recoloring on an automatic or semi-automatic basis.

The method disclosed in U.S. Pat. No. 6,502,383 to Utsugi utilizes image processing in order to simulate the effects of makeup on a target face. This system, however, does not utilize automatic or semi-automatic face detection, feature detection, or parameter estimation and as a result requires manual user input for estimating the necessary parameters. Furthermore, this system was not intended for general virtual face modifications, and does not perform virtual plastic surgery nor does it perform hair restyling/transformation.

The method and system of U.S. Pat. No. 6,433,052 to Kurokawa et al. utilizes pre-stored hair style to restyle a user image. In other words, it is a unidirectional hair replacement that does not allow the ability to extract hair styles from one image, and place that style in another image. As well, this system or method is only a unidirectional hair replacement system, not being capable of face readjustment, replacement, or modification. Finally, this system requires hair style with basic information to be stored, and does not claim an automatic method for such information extraction.

The system and method of U.S. Pat. No. 6,937,755 to Orpaz discloses a manual method for visually demonstrating make-up cosmetics and fashion accessories. This visualization requires manual user inputs in order to work effectively (i.e. it is neither automatic nor semi-automatic), and does not allow for hair restyling, advanced face modifications such as facelifts, or face feature e-coloring and replacement on an automatic or semi-automatic basis.

A system and method is disclosed in U.S. Pat. No. 5,495,338 to Gouriou et al. which utilizes eye information (such as the inner eye colors) in order to estimate the ideal eye makeup for a given eye. However, this approach is purely a cosmetics suggestion system; it does not perform any face adjustment, hair restyling, or face recoloring automatically, semi-automatically, or even manually.

U.S. Pat. No. 5,659,625 to Marquardt discloses a method involving a geometric model to fit the face. These geometric models can be used for face animation as well as for cosmetics applications. However, this system, again, does not achieve automatic or semi-automatic feature modification, facelifting, or hair restyling.

A method for locating the lips of a face by bandpass filtering is described in U.S. Pat. No. 5,805,745 to Graf. However, this reference does not disclose a means for detecting other features of the face, neither does it describe automatic or semi-automatic face modifications, facelifts, or hair restyling. Furthermore, the bandpass filtering method is unsophisticated, and does not involve feature extraction methods utilizing edge, color and/or shape information, or relative feature and face information processing in order to accurately locate the facial features.

The method and apparatus described in U.S. Pat. No. 5,933,527 to Ishikawa allows a user to specify a search range which is then used to search for specific facial features. However, the approach taught therein is not capable of automatic facial feature detection, and is incapable of automatic or semi-automatic advancement face processing algorithms such as facelifts. Further, there is no mention of an application operable to switch the features of one face with another automatically or semi-automatically, and there is no means for hair restyling or replacement.

Finally, U.S. Pat. No. 7,079,158 to Lambertsen describes a virtual makeover system and method. However, the reference does not disclose a means for virtual operations on the face or automatic or semi-automatic advanced face modification such as facelifts, and suffers from a relatively complicated user interface.

In addition to these prior art references, there are several systems provided on the Internet that are operable to perform manual face modification, for example, EZface™, Approach Infinity Media™, and others exist. However, none of these systems are capable of face feature modification, hair restyling, advanced face processing such as facelifts, either automatic or semi-automatic. As well, all of these systems employ Macromedia™ flash technology which places a heavier computational burden on the client/user computers and is not easily capable of being widely employed on mobile phones and handheld computers. Finally, the user interface complexity of all these systems is problematic as they are generally difficult to use, complicated to adjust, and far more elaborate to use than a simple "choose and modify" approach.

In view of the foregoing, what are needed are methods and systems for modifying digital face images that overcome the limitations of the prior art described above. In particular, what is needed is a method and system employing advanced detection and localization techniques for enabling automatic and/or semi-automatic image modification. Further, what is needed is a method and system where facial modifications are processed on host servers instead of the user computers. In addition, what is needed is a method and system that is simple, easy to use, and capable of being implemented on a variety of devices.

SUMMARY OF THE INVENTION

The object of the present invention is a means of automatically modifying digital images of faces and other features of head shots (such as hair and the neck area, for convenience referred to together as a "face"), such means of automatic modification providing in whole or in part the modification of the digital image. Modification of a digital image of a face in accordance with the present invention that is in part automatic is referred to as "semi-automatic" modification.

In particular, the present invention provides an automatic or semi-automatic means for visualizing the results of a facelift operation, face modification operations, as well as hair restyling changes using Artificial Intelligence (AI).

In one aspect, the present invention provides a method for the modification of face digital images comprising: detecting a face in a first digital image and a face in a second digital image; establishing regions of interest in the face in the first digital image and regions of interest in the face in the second digital image; detecting features in the regions of interest in the face in the first digital image and features in the regions of interest in the face in the second digital image; and matching and replacing one or more of the features in the face in the first digital image with the one or more features in the face in the second digital image, thereby defining a modified digital image. The features are, for example, a person's eyes, eyebrows, nose, mouth, lips or hair. Processing steps may include blending, re-coloring, shifting or resizing the features in the face is generating the modified image, achieving a photo-realistic result. User feedback and adjustment enables fine tuning of the modified images.

In another aspect, the present invention provides a method of conducting a virtual "facelift" in modifying a digital image, the method comprising: detecting a face in the digital image; establishing regions of interest in the face in the digital image; detecting features in the regions of interest in the face in the digital image; smoothing the face in the digital image to simulate a facelift; and replacing the features in the face in the digital image (since these features are unaffected by the facelift operation), thereby defining a modified digital image. User feedback and adjustment enables fine tuning of modified images.

In another aspect, the present invention provides a method for virtual hair restyling of a digital photo, the method comprising: detecting a face in the digital image; establishing the region of interest of the face; establishing the region of interest of the target hairstyle, and then to blend the region of interest of the target hair style over the region of interest of the face.

Advantageously, the present invention is operable to detect faces within digital images in either on an automated basis using detection algorithms or "semi-automated" manner comprising of an initial automated estimate of the facial location followed by a user fine-tuning the estimates.

Feature detection and localization techniques are carried out on one or more target photos that are selected by a user. The user also requests the features of interest, e.g., hair, eyes, nose, lips, and other features, and whether blending to create a "facelift" effect should be performed. The relevant features are recolored, blended and combined to result in a photo-realistic modified face.

The present invention also enables fine tuning of size and location of the facial features, either automatically or manually, to increase the perceived beauty of the face.

The digital images of faces can be derived from video, and face modifications can be performed on a frame-by-frame basis to generate new images and/or video. Video tracking can be used to improve the accuracy and reliability of the final video result.

The face detection and modifications can be performed on either a two dimensional photo, or an estimated three-dimensional template of the face within the photo. The latter approach allows for compensation of tilted or rotated faces to result in realistic plastic surgery visualizations even in any setting.

In yet other aspects, the present invention can be embodied in a variety of systems for matching and replacing features within digital images, providing virtual "facelifts", and detection of faces in digital images is also provided, including implementation as a website, through mobile phones, hand-held computers, or a kiosk. A stand alone or Internet-connected kiosk operable to perform real-time modification, for example with a built-in camera, is advantageous because there is no need for user owned hardware.

A simple illustrative user interface is provided allowing the user to select which features (e.g., eyes, eyebrows, nose, mouth, lips, hair, etc.) to be selected from a plurality of images, consisting of an intuitive 'from-this-image' or 'from-that-image' selection criteria for each feature followed by the user selecting advanced single-button options (such as a "facelift") and pressing a single "modify" button.

Related computer program products are also disclosed. For example, AJAX (Asynchronous Javascript And XML) can be used to implement the present invention as a beauty, cosmetics, or plastic surgery application. The advantages of using this architecture are that no matter what the client device might be (cell phone, hand held computer, variety of computer makes, models, and types, computer kiosks, etc.), the application can still run successfully through a common Internet browser.

Accordingly, custom advertising can be delivered based on a user's facial modification requests, such that the advertisements, profiles, products, or any other information is selectively shown to the user. Also, the invention can be offered as a service to plastic surgeons, beauty salons, cosmetics manufacturers, modeling agencies, police and other security agencies, as well as anyone else interested in automated or semi-automated face augmentation.

In addition, the present invention can form the basis of a social network implemented on the world wide web, mobile, or other electronic platform which allows for user sharing, displaying, storing, interacting, and web logging of the user's face modification results or the face modification results of other users.

In another aspect of the invention, a method is provided for modifying digital images comprising: detecting a face in a first digital image and optionally detecting a face in a second digital image, if the location of the face in the first digital image or the second digital image has not already been established; establishing regions of interest in the face in the first digital image and optionally establishing regions of interest in the face in the second digital image; detecting features in the regions of interest in the face in the first digital image and optionally detecting features in the regions of interest in the race in the second digital image; and modifying the first digital image by either matching and replacing one or more of the features in the face in the first digital image with the one or more features in the regions of interest in the face in the second digital image, thereby defining a modified digital image; or isolating from modification the regions of interest in the first digital image, modifying the first digital image other than the regions of interest, and replacing the regions of interest into the modified first digital image.

In a further aspect of the present invention, a method is provided for modifying a digital image comprising: detecting a face in the digital image; establishing regions of interest in the face in the digital image; detecting features in the regions of interest in the face in the digital image; augmenting the face in the digital image by smoothing selective regions; and replacing the features in the face in the digital image, thereby defining a modified digital image.

In still another aspect of the present invention a system is provided for modifying digital images comprising: a computer linked to a database, the computer including or being linked to a utility for enabling one or more users upload, store, retrieve, email, display and/or manage digital images; a modification utility linked to the computer, the modification utility being operable to provide instructions to the computer that enable the computer to detect a face in a first digital image and optionally detect a face in a second digital image, if the location of the faces in the first digital image or the second digital image has not already been established as well as establish regions of interest in the face in the first digital image and optionally establish regions of interest in the face in the second digital image; detect features in the regions of interest in the face in the first digital image and optionally detect features in the regions of interest in the face in the second digital image; and modify the first digital image by either matching and replacing one or more of the features in the face in the first digital image with the one or more features in the face in the second digital image, thereby defining a modified digital image; or by isolating from modification the regions of interest in the first digital image, modifying the first digital image other than the regions of interest, and replacing the regions of interest into the modified first digital image.

In yet a further aspect of the present invention, a computer program product for enabling the modification of digital images is provided comprising: a computer readable medium bearing software instructions; and the software instructions for enabling the computer to perform predetermined operations, the predetermined operations including the steps of: detecting a face in a first digital image and optionally detecting a face in a second digital image, if the location of the faces in the first digital image or the second digital image has not already been established; establishing regions of interest in the face in the first digital image and optionally establishing regions of interest in the face in the second digital image; detecting features in the regions of interest in the face in the first digital image and optionally detecting features in the regions of interest in the face in the second digital image; and modifying the first digital image by either: matching and replacing one or more of the features in the face in the first digital image with the one or more features in the regions of interest in the face in the second digital image, thereby defining a modified digital image; or isolating from modification the regions of interest in the first digital image, modifying the first digital image other than the regions of interest, and replacing the regions of interest into the modified first digital image.

BRIEF DESCRIPTION OF THE DRAWINGS

A detailed description of the preferred embodiments are provided herein below by way of example only and with reference to the following drawings, in which:

FIG. 6a, FIG. 6b, FIG. 6c and FIG. 7 illustrate feature detection steps for eyes;

FIG. 11a, FIG. 11b and FIG. 11c illustrate a progression of search box sizes in face detection;

FIG. 12 illustrates face symmetry calculation where the average pair-wise square error between mirror pixels is used as an indication of the face asymmetry (or, the inverse of it as an indication of the face symmetry);

FIG. 13a and FIG. 13b illustrate example templates for face detection purposes;

In the figures, embodiments of the invention are illustrated by way of example. It is expressly understood that the description and drawings are only for the purpose of illustration and as an aid to understanding, and are not intended as a definition of the limits of the invention.

DETAILED DESCRIPTION OF THE INVENTION

The term "MODIFACE" as used herein refers to a particular embodiment of the present invention that is a system application allowing users to upload, email, send, and display digital images of faces, and then apply the automatic or semi-automatic modification method and software utility of the present invention. In one aspect thereof, MODIFACE is a system that can be accessed through the World Wide Web, and is a practical, easy-to-use system, providing access to the functions particularized below.

The object of the present invention is a means of automatically modifying digital images of a face and other features of head shots (such as hair and the neck area, for convenience referred to together as a "face"), such means of automatic modification providing in whole or in part the modification of the digital image. Modification of a digital image of a face in accordance with the present invention that is in part automatic is referred to as "semi-automatic" modification.

The present invention is a method and system modifying the facial features of a digital image with those of another digital image, changing the hair of one photo with the hair in another photo, and/or performing a "virtual facelift" or face cleansing/smoothening operation on a desired image. These actions have many steps in common, and are explained below.

Figure 1A:
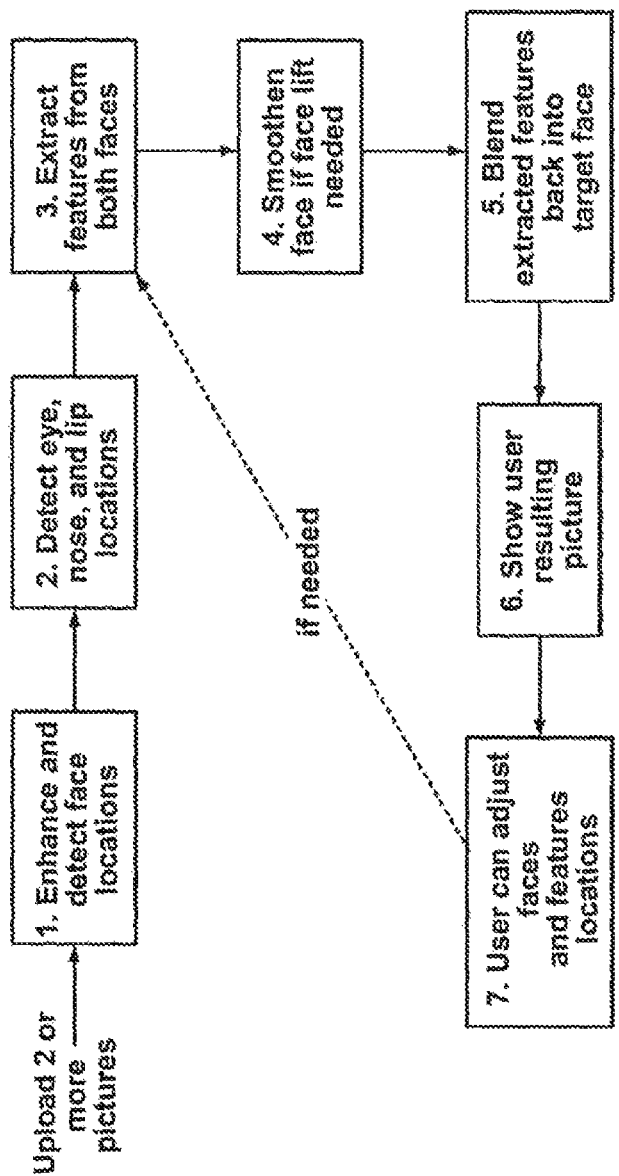
FIG. 1A illustrates a flow chart of method steps of the present invention.

As illustrated in the flowchart of FIG. 1A, the first step in one particular implementation of the present invention, is to upload the one or more images to a web server.

Figure 1B:
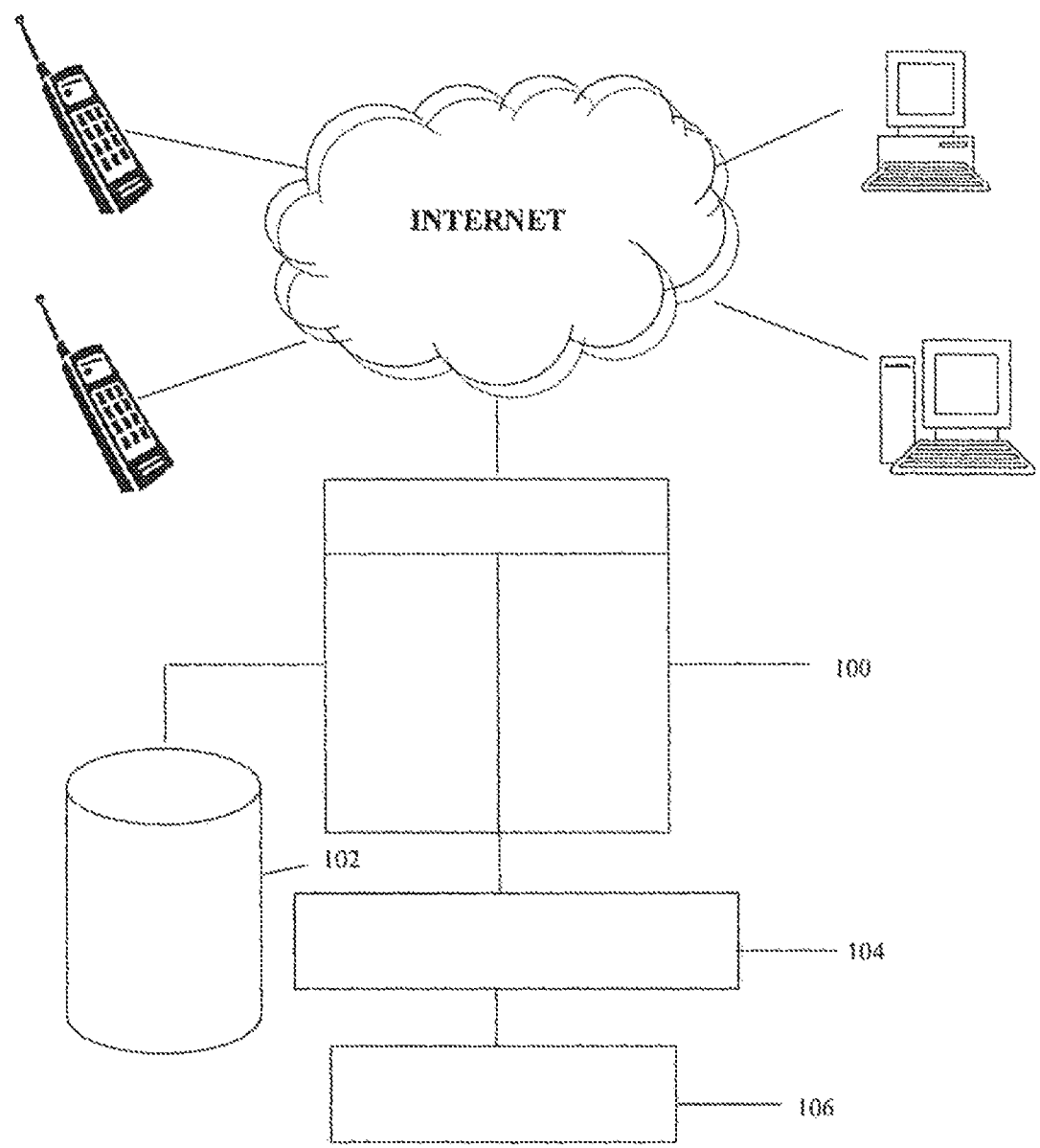
FIG. 1B is a system diagram illustrating one embodiment of the system of the present invention.

The images are generally uploaded to a web server connected to the Internet, such web server incorporating standard resources and functionality generally used for a web server that is operable to receive uploaded digital images from a plurality users, store the digital images, and enable users to access selected digital images based on hierarchical access thereto, as well as sort and manage digital images to which they have access. It is also known how to provide such a web server that is operable to provision mobile devices, including as particularized below. A representative embodiment of such architecture is illustrated in FIG. 1B. The web server (100) is linked to a database (102) and to a server application (104). The server application (104) incorporates the standard features described above, and linked to the database (102) provides the image storage, retrieval, sorting and management features mentioned above. In accordance with the present invention, the server application (104) also incorporates a modification utility (106), which is programmed is a manner that is known to incorporate the functionality described below.

One aspect of the invention therefore is a face modification system that incorporates the functionality of the modification utility (106). FIG. 1B illustrates one particular implementation of the face modification system, i.e. implementation as a web service provisioned by web server (100) to remote computers (personal computers or wireless devices for example).

It should be understood that the present invention contemplates numerous other implementations as well. For example the face modification system of the present invention may include a personal computer, and loaded thereof a client application incorporating the modification utility. It should also be understood that the computer program of the present invention can be provided as a network application, accessible to a plurality of computers, as an ASP solution delivered to a plurality of personal computers, or to a plurality of web server that in turn provision remote computers (for example by providing the functions of the present invention as a means of enhancing the features made available by web servers providing on-line community functionality). The face modification system, or aspects thereof, can also be integrated with numerous existing tools, for example, software tools used by cosmetic surgery clinics. It should also be understood that the system of the present invention can work with mobile phones and handheld devices such that user images and face modification requests are sent via email (or mobile multimedia message) to the system of the present invention, and the result is returned via email (or mobile multimedia message) back to the user.

Also, as explained below, the face modification system of the present invention, can be provided as a kiosk.

Figure 2:
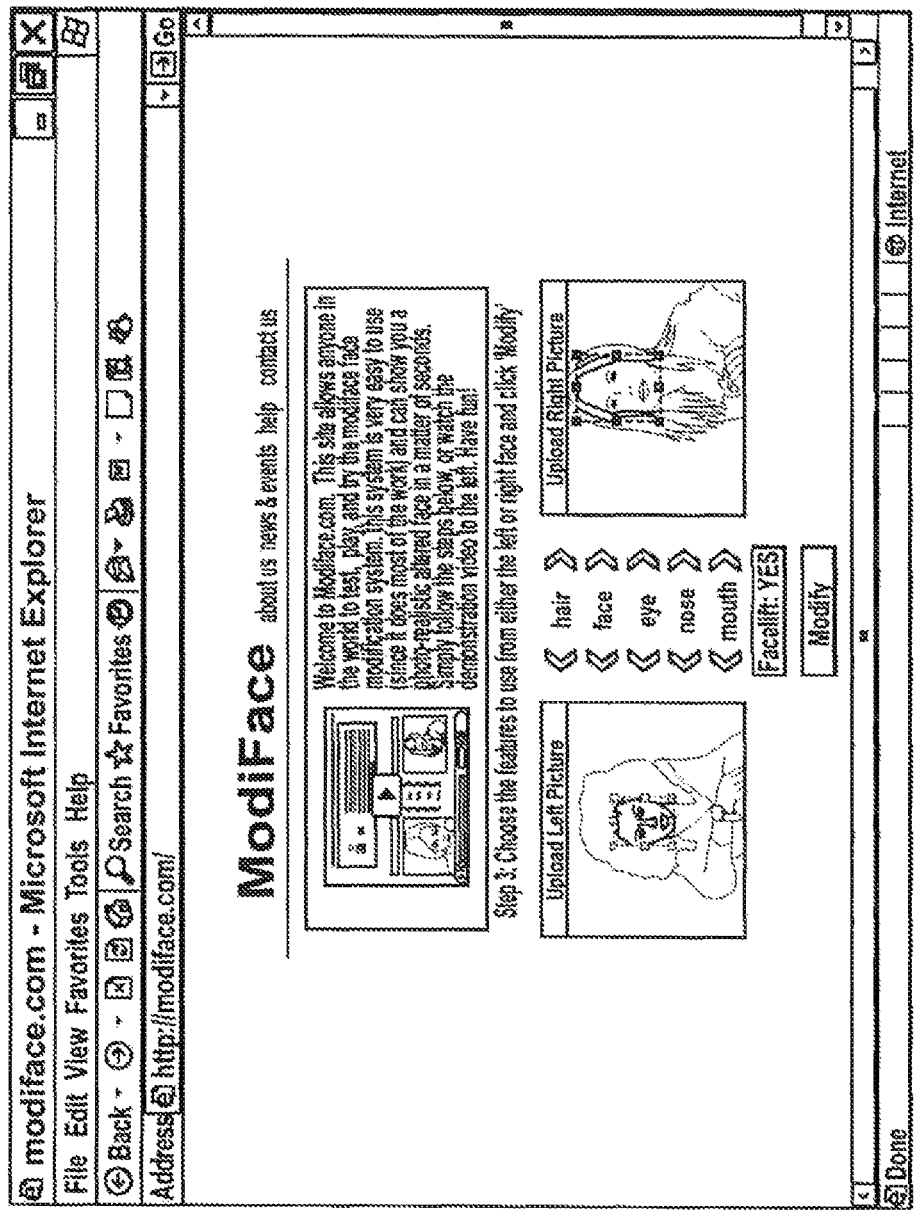
FIG. 2 and FIG. 3 illustrate an example web interface for an embodiment of the system of the present invention.
Figure 3:
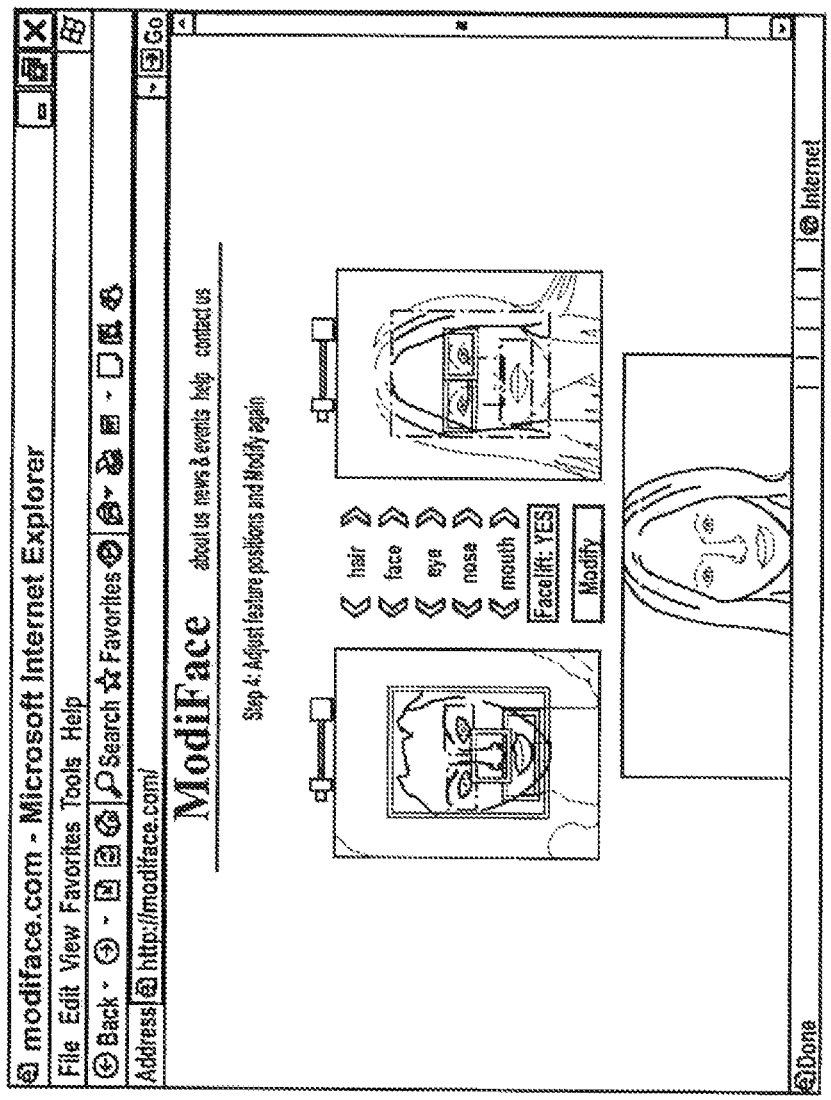

In one particular implementation of the present invention, illustrated in FIGS. 2 and 3, the web server (100) (shows in FIG. 1B) presents a web page that permits users to upload images or select images already available on the web server (100) and initiate the face modification features described below.

In one aspect of the present invention, the face modification system first detects the location of the face and facial features of a target digital image, including the eyes, nose, and lips.

Prior to any of these steps, optionally a smart facial image enhancement is performed which involves taking a digital image, automatically or semi-automatically (comprising of an initial automatic identification follows by user intervention) identifying the face, and optionally performing histogram equalization or contrast adjustment on the face followed by blending the equalized histogram onto the original digital image. The blending approach involves a gradual blending such that it is more heavily equalized in the center of the face and less so around the edges. Also, only partial histogram equalization is performed in order to not upset the balance of colors on the face significantly, which can cause distortion. In one particular aspect of the invention, this is accomplished by performing a weighted or partial image histogram equalization which places more weight on the digital image pixels near the boundaries than digital image pixels near the center.

In one particular aspect of the present invention, the method and system described utilizes computer vision and machine learning algorithms in order to detect these features. In the case of the face, this consists of matching a probabilistic face model, or a face template, to the various locations of the digital image in order to find the most probable location of the face, as illustrated in the examples provided below. This action is performed at multiple scales and in a hierarchical fashion in order to detect different face sizes as well as increase the efficiency of the computations. Pre-computations such as detecting specific skin-like colors in as image can be used to speed up the operation even further.

The core algorithm for face detection can be implemented in software or in custom hardware (e.g., field programmable gate arrays or very large scale integrated circuits). The methodology for efficient face detection and localization on field programmable gate arrays has been described, for example, Nguyen, D., Halupka, D., Aarabi, P., Sheikholeslami, A., "Real-time Face Localization Using Field Programmable Gate Arrays", *IEEE Transactions on Systems, Man, and Cybernetics*, Part B, Vol. 36, No. 4, pp. 902-912, August 2006. This particular face recognition technique consists of a block by block implementation of the face searching system in digital logic running on a field programmable gate array.

The detection of the features such as eyes, nose, and lips is performed as follows, in one aspect of the present invention. First the located face is divided up into regions of interest which may contain the eyes, nose, and lips. These regions may be overlapping. In the eye region, the image intensity gradients of the region are extracted and the region with the largest intensity gradients within an eye template is selected as the eye location (see FIG. 6*a*, FIG. 6*b*, FIG. 6*c* and FIG. 7). The size of the eye template is proportional to the size of the detected face. The same highest gradient oval detection is performed on the right half of the region. The resulting highest-gradient ovals are used as the presumed eye locations.

The lips are detected next by a similar procedure, where the region with the largest edge gradients within a lip template is selected as the lip.

The location of the nose is determined based on the positions of the eyes and the lips. The nose will have a bottom that just slightly overlaps with the lips, a top that touches the edge of the eyes, and a width that is in proportion to the face.

Once these features have been located, they can be combined with the detected features of another photo (detected using the same procedure) by blending either a face or facial feature into another digital image. Prior to the blending, the feature locations are preferably adjusted to fine tune the previous feature locations and by 'matching' the locations of the features of the two faces. This matching is done by comparative adjustments to the detected eye, lip and nose locations and slight adjustments to align the gradient intensities of the eyes and lips.

Figure 8C:
FIG. 8a, FIG. 8b and FIG. 8c illustrate replacement steps.
Figure 8B:
Figure 8A:
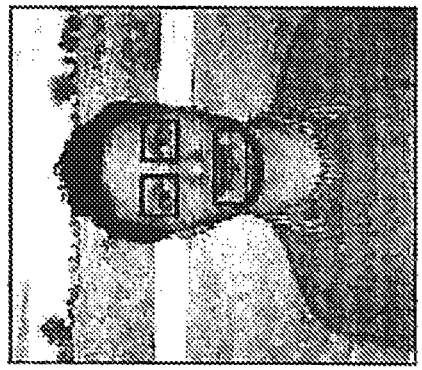

Once the feature locations have been finalized, the desired feature is color adjusted and blended on top of the original feature. For example, for switching the eyes (or nose or lips) of two photos, once the eyes (or nose or lips) in both images have been localized, the eye (nose or lip) from the first image (see FIG. 8a) is smoothly blended into the eye (or nose or lip) box of the second image (see FIG. 8b) resulting in new combined image (see FIG. 8c).

As used herein, the term "box" should be understood to include any shape suitable to focus in on a region of interest, whether the area of interest relates to the eyes, lips, nose or otherwise. For example, an eye box can be round, square, rectangular, oval, pentagonal, etc.

Figure 9A:
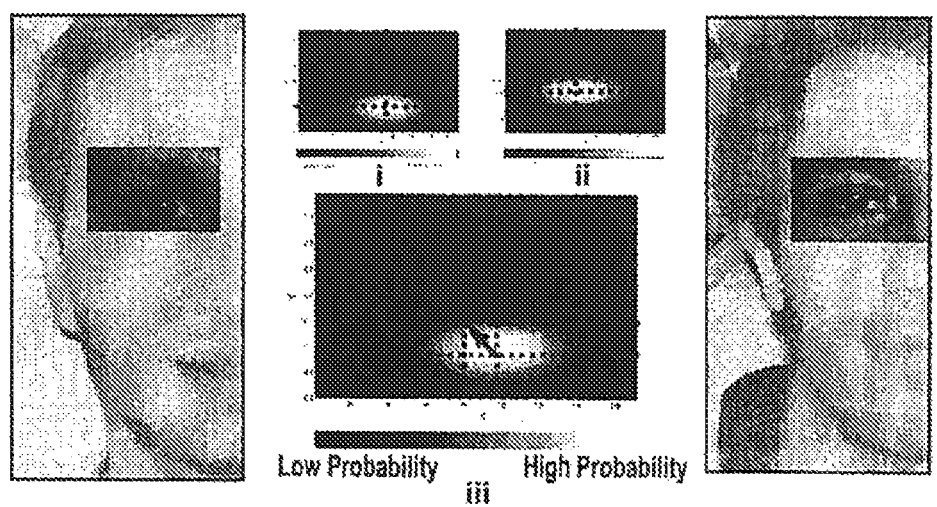
FIG. 9a and FIG. 9b illustrate shifting for eye boxes.
Figure 9B:
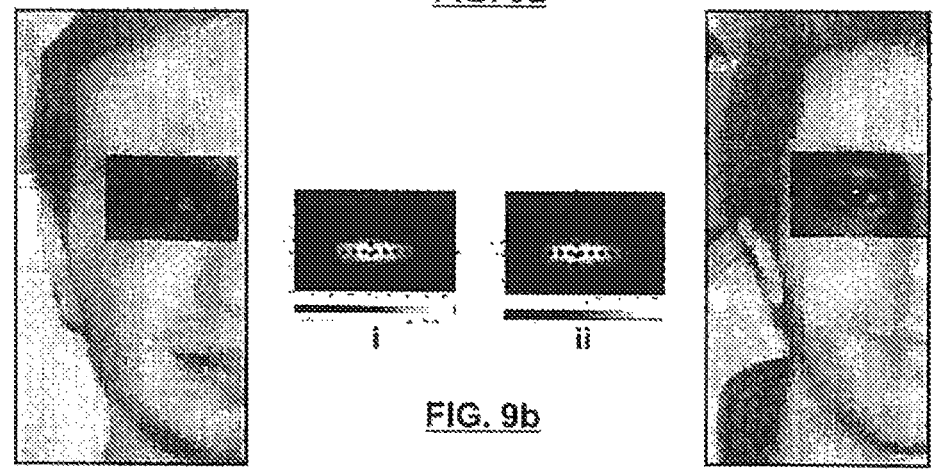

Prior to this blending, the features can be recolored (by performing histogram transformation on each of the color histograms in order to equalize the red, green, and blue average pixel values for each image) to the features histograms of the previous features (the features which are being replaced). This color transformation is preferably performed when changing the eyes, nose, and lips. In order to improve the level of realism of the final result, the re-coloring is applied mainly using the color values of the outer areas of the features and less so in the center of the feature. For example, in the case of the eye, the inner eye color of the desired eye makes a smaller contribution to the color histograms than the color around the eye. This is further illustrated by FIG. 9a and FIG. 9b with the capture of the color transformation for changing eyes.

Figure 10A:
FIG. 10a, FIG. 10b and FIG. 10c illustrate a final face after replacement, shifting and blending.
Figure 10B:
Figure 10C:

Different blending masks can be applied to the recolored areas and original features and the masked layers are then added to result in the final features. The mask shapes for each feature are custom designed for the general shape of the feature. Depending on the mask, the blending consists of gradient filling whose center consists entirely of the first eye (or nose or lip) and whose borders (as defined by the feature mask) consist entirely of the second eye (or nose or lip) box. In between the center and the border, the ratio of the first eye (or nose or lip) and right eye (or nose or lip) gradually changes in order to result in a smooth contour and smooth blending. Similarly, this blending can be performed for other facial features (or even for the entire face), as requested by the user. This is further illustrated in FIG. 10a, FIG. 10b and FIG. 10c with the final appearance of a face after the replacement, shifting and the blending steps have been performed.

The above achieves the results of exchange of features between selected digital images of faces, in accordance with the present invention.

As stated previously, another aspect of the present invention is the performance of a virtual facelift or face cleansing/smoothening operation. This is done by first detecting the locations of the eyes, nose, and lip as outlined above, smoothing/lifting the face by blurring it (or, as a more complicated operation, retouching the face) in such a manner that the blurring (or retouching) is most severe in the center of the face and gradually decreasing in intensity further away from the face center, and finally by re-blending the initial (non-smoothed) face features (eyes, nose, and lip) on top of the smoothed face. As a more advanced operation, instead of blurring the center of the face the blurring can be applied selectively to regions such as below the eyes, between the eyebrows, and around the lips to simulate customized facelift or facelift product applications.

Outlined below are the specific details of a subset of the procedures claimed in this patent:

Feature Detection

The main facial features (lips and eyes) are detected by the following set of steps:

1. The gradient magnitude image of the face is obtained (this is done by subtracting each pixel from the pixel just above it, or, from taking the square root of the square of the vertical pixel difference plus the square of the horizontal pixel difference).

2. We focus on the specific locations of the face where we expect to find specific features.

3. A search is conducted to find a small sub-region (the sub-region size is chosen in proportion to the face size) within each focused region such that the total gradient magnitude in each sub region is maximized. Please note that usually this summation is done on a weighted basis using an appropriate feature mask.

Figure 16:
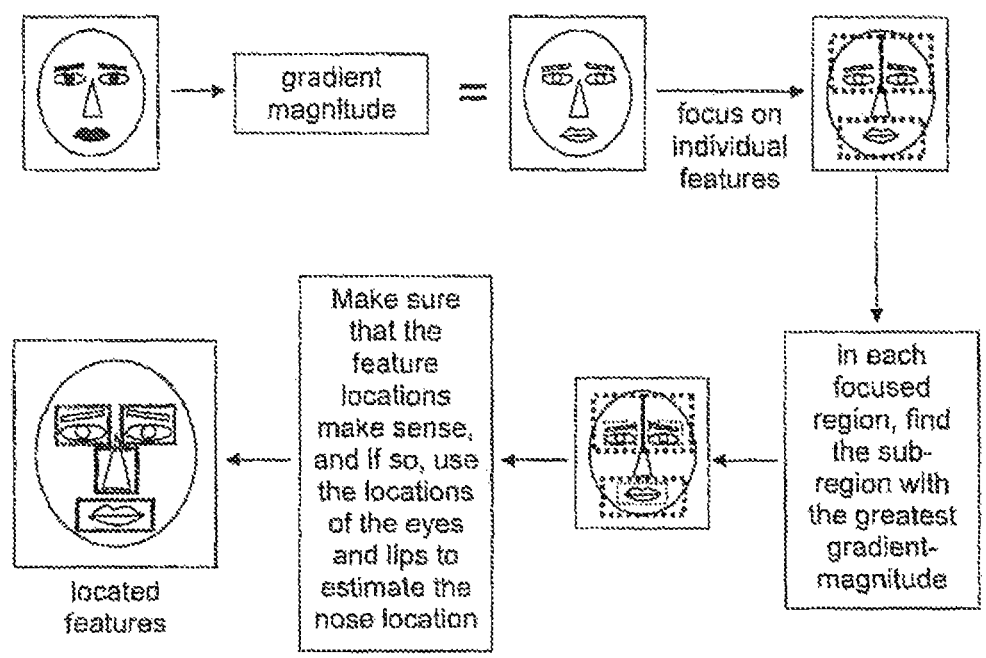
FIG. 16 illustrates the process of feature detection.

4. Once the lip and eye locations have been found, the nose location is estimated as follows
   a. Nose_height=0.4*face_height
   b. Nose_width=0.4*face_width
   c. Nose_left=(eyes_horizontal_mid_point+lip_horizontal_mid_point)/2−Nosewidth/2
   d. Nose_top=(lip_top+lip_height*0.3−Noseheight)
   FIG. 16 illustrates this process of feature detection.

Blending

The blending of a feature is accomplished as follows;

1. The desired feature is recolored to match the color of the original feature.

2. The result of step 1 is multiplied by a feature mask.

3. The original feature is multiplied by the inverse (i.e. one minus each of the mask values, which range from 0 to 1) of the feature mask.

4. The resulting images of steps 2 and 3 are added pixel by pixel to make the final blended feature image.

Figure 17:
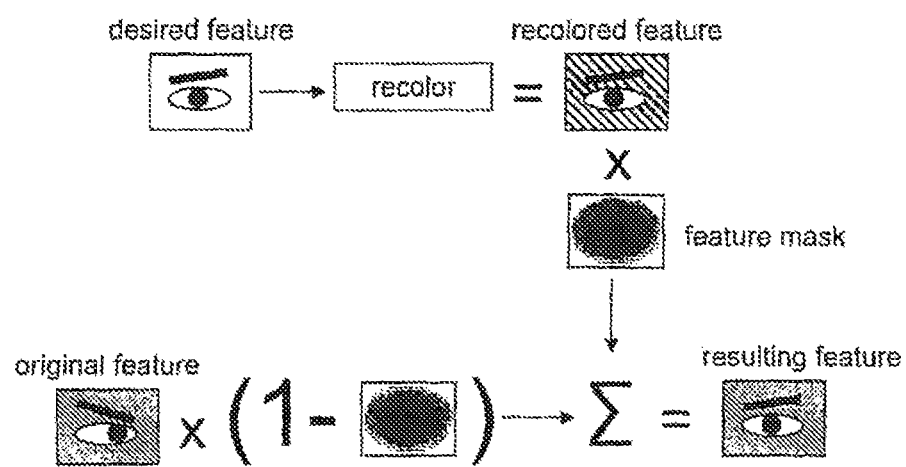
FIG. 17 illustrates the blending process.

FIG. 17 illustrates the blending process.

Recoloring

Recoloring of the desired feature to match the color of the original feature (especially at the boundaries) is accomplished as follows:

1. The weighted average (i.e. weighted mean) of each of the red, green, and blue channels of the original feature are calculated as follows:
   a. A feature color mask is multiplied pixel-by-pixel with each of the red, green, and blue channels of the original feature image; and
   b. The resulting pixel values are summed across each of the red, green, and blue channels, and divided by the total sum of the pixels in the feature color mask—we denote these averages as Or, Og, Ob.

2. The weighted average (i.e. weighted mean) of each of the red, green, and blue channels of the desired feature are calculated as follows:
   a. A feature color mask is multiplied pixel-by-pixel with each of the red, green, and blue channels of the desired feature image;
   b. The resulting pixel values are summed across each of the red, green, and blue channels, and divided by the total sum of the pixels in the feature color mask—we denote these averages as Dr, Dg, Db.

3. The value of each of the pixels in the desired image are modified by added the value Or−Dr to each of the red channel pixels, Og−Dg to each of the green channel pixels, and Ob−Db to each of the blue channel pixels, resulting in the recolored desired image.

Comparative Feature Adjustment

Figure 18:
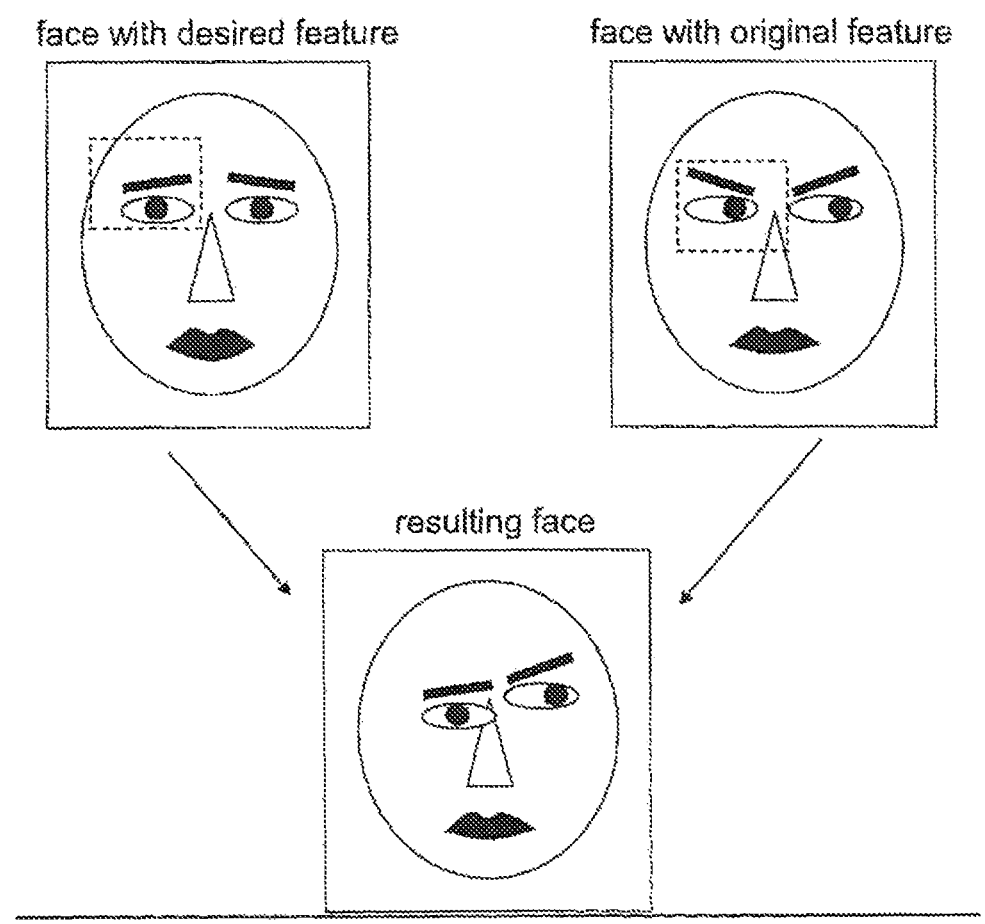
FIG. 18 illustrates the requirement for the comparative feature adjustment.

On certain occasions it is possible to have two feature boxes (one on the original face, one on the desired face) where both boxes are located correctly but, relative to each other, are not at the same locations on the face. In this scenario, the resulting modified face will have features that will look incorrect. This comparative feature adjustment situation is best illustrated in FIG. 18.

As a result of a modified face possessing features that appear incorrect, whenever features are being replaced on the original face, a comparative adjustment is performed to make sure that, all features are at the same relative locations. This is accomplished by the following steps:

1. Obtaining the gradient magnitude for both the desired features and the original features.
2. Finding an alignment between the two located features such that their gradient magnitudes have the highest degree of overlap.
3. Adjusting the feature location of the desired face according to step 2.

Figure 19:
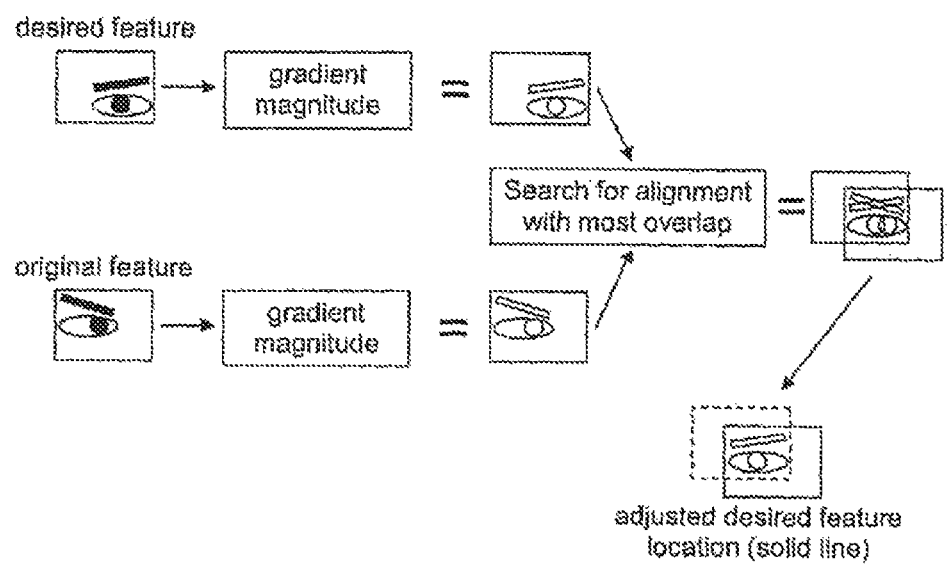
FIG. 19 illustrates a scenario where a comparative feature adjustment is performed.

This process is further illustrated in FIG. 19.

Location Adjustment Based on Facial Beauty Scores

The localized features can be optionally processed by a "beauty" filter which utilizes mathematical measurements of the facial features in order to estimate the validity of the features from a classical "beauty" perspective, in a manner that is known. (Aarabi, P., Hughes, D., Mohajer, K., Emami, M., "The Automatic Measurement of Facial Beauty", *Proceedings of the IEEE International Conference on Systems, Man, and Cybernetics*, Tucson, Ariz., October 2001.) If the resulting feature locations are deemed to be outside the range of acceptability, they are modified according to the feature location beauty specifications. For example, if the eye and lip locations represent a highly asymmetrical face, they are slightly modified to produce a more symmetrical face.

Applications and Implementations

As stated earlier, the face modification system can be embodied in a variety of ways. For example, the present invention can be implemented through a common website on the World Wide Web. As stated earlier, this consists of the MODIFACE system being implemented on a computer server (or servers) which takes in user uploaded photos, a set of directives (such as arrows indicating which features and/or face should be included in the final result—as illustrated in FIGS. 2 and 3), processes them as outlined above, and generates the resulting photo for viewing by the user. The system also allows for the user to intervene by adjusting the located face and facial features, and/or to issue new directives for a new modified result. In other words, the system is initially in a full automatic mode which tries its best to perform the modifications accurately, but allows the user to make subsequent adjustments to refine the results (i.e. hence becoming semi-automatic).

In accordance with one aspect of the present invention, a user first obtains one or more digital images of a face and uploads it to the MODIFACE website. The resulting picture is shown with face and feature locations, allowing a user to change locations and repeat the operation.

Another implementation of the system of the present invention involves a user who captures a photo through a scanned image, a digital camera, a camera-phone, and any other device, system, or method of capturing an image, and sends this image (through email, a website, text-messaging, or other mobile, wired, wireless, or method for communication) to a central MODIFACE server (e.g. web server (100) illustrated in FIG. 1*b*) along with a set of directives about what modifications should be performed.

This server then automatically performs the requested operations as outlined above, and sends the resulting photo and photo parameters (such as the locations of the face and facial features) back to the user through email, text-messaging, or any other wired or wireless means of communication. There can be further user intervention at this point, such as adjusting the feature locations or directives, and this would result in another iteration of the adjustments and photo sent to the MODIFACE server and the results sent back to the user.

Other implementations of the present invention include kiosks located in malls or stores, for example, or other location which can capture a photo of an individual and perform the MODIFACE operations as requested by that individual, allowing intervention and adjustments as described above. In this scenario, the MODIFACE system could either be external to the kiosk, or internal which would allow the device to operate independently.

Another implementation of the present invention is as a stand-alone or server-based kiosk. This system, in either the stand-alone or server-based modes, would consist of a stand, a keypad or keyboard or a set of buttons, a display (possibly a touch screen for easier operation), as well as a camera mounted on the top. The camera captures images of a user standing in front of the kiosk and displays their image along with any requested modifications, on the kiosk display, using the approach described above.

This approach could even be extended to mobile phones and handheld computers as well as digital cameras, which can contain mobile versions of the MODIFACE system for direct utilization by a user. In this scenario the MODIFACE system would be embedded (running on a custom chip or as part of the device system itself) in the device directly, without the need for external communication.

An alternative to mobile implementations is a custom developed electronic device which is operable to capture user photos and perform face modifications by uploading photos to it or by means of an onboard camera. This device or digital pad would allow all of the modifications to be performed without the need for external communication.

As mentioned above, the present invention can also be implemented as a web service, whereby face detection and/or face modifications are carried out on digital images and the location of the detected face and facial features and the likelihood that the submitted images contain faces (i.e. the face score) can be remotely returned to a user.

The present invention can be extended to searching, filtering, or processing the results of a visual search query submitted by a user to a database or web search system, such that the images are sorted based on their likelihood of containing a face. In this particular embodiment of the present invention, the visual search query would rely on the techniques described herein for analyzing a digital image to determine whether there are facial features, and if facial features exist, determining their likely location within the digital image.

The face detection aspect of the present invention can also be used for identifying faces in particular magazines, internet sites, or newspapers, and automatically selecting the current popular faces that are most frequently mentioned in the news or in particular media. For example, an application in accordance with the methods of the present invention can be created operable to automatically search popular media (newspapers, internet sites, magazines, etc.) and detect faces in images and track the most frequently cited names, returning the images that have the highest likelihood of containing a face.

The present invention can also be extended to conduct face detection and face feature extraction and replacement for forensic, investigative, or other police/security applications.

The present invention can also be extended so that face detection and face feature extraction and replacement is used for online, mobile, or handheld gaming applications, e.g., a game whereby a user has to guess the name of the original face from which each feature comes from.

The present invention also includes using face detection and face feature extraction as well as face modification (such as facelifting) for targeted cosmetic advertisement and beauty suggestion purposes, such that cosmetic or beauty advice given is generated automatically based on the facial features and facial characteristics of a submitted digital image.

Extension to Videos

It should be understood that the method and system of the present invention, because of its "automatic" nature, can be applied to videos as well. According to this aspect, a video segment of a user can be selected for modification and a target photo or video would be selected with a set of directives about which feature to include from either video. Here, the MODIFACE method and system would be applied on a frame by frame basis, which would then be improved by means of video tracking to fine tune the located features. Video tracking in this situation can resolve occasional errors in the location of the detected face and facial features by utilizing the relative continuity of the video frames.

For this, the input to the video MODIFACE system would be one or more videos as well as a set of directives. The output of the system would be a video with the modified features of the input video(s) and wife the tracked feature locations which can be modified for further modification iterations, as in the previous cases.

Another realization of the system for video applications would be automatically performing facelifts on the video of a user, by performing repeated face detections, followed by full or partial facelifts using the system of this invention.

Example Interface for Invention

The interface for the MODIFACE system can take many different forms. One example web-based interface is depicted in FIG. 2. This interface allows for up to two images to be uploaded to the website, as well as for a set of input buttons (i.e., "hair", "face", "eyes", "nose", "mouth", "Facelift" and "Modify") indicating which feature(s) to select from which face, whether to perform a facelift, and initiating the face modification.

Once the user has entered the parameters and images (or videos), the system of the present invention is operable to perform automatic face modification and show the results to the user. Also shown to the user are the estimated locations of the facial features, which can be dragged and moved by the user in order to yield a more accurate modification, if necessary to achieve an accurate result, or if otherwise desired by the user. This particular user intervention also illustrates the semi-automatic nature of the present invention. It should be understood, however, that the automatic face modification in accordance with the present invention, even if user intervention is involved, provides significant reduction in time over attempting to perform the face modification manually. If user intervention is required or desired, the user simply moves the feature or face boxes, issues a new set of directives (or keep the old ones), and selects the "Modify" button once again. This feature of the present invention is illustrated in the context of a representative interface in FIG. 3.

Audio Interface

The present invention and interface requires a user to choose a set of modifications by selecting which feature/face/hair should be extracted front which photo. This type of selection can be set using a computer mouse or pointing device, using a touch screen interface, using a set of buttons or a keyboard, or with an acoustic interface.

The first type of acoustic interface that can be employed as input is based on speech recognition. By saying one or more directions, e.g., "right" or "left", the system can make the appropriate selection by: (i) capturing the sound of the user with one or more microphones; (ii) performing speech recognition on the sound; (iii) determining if the user had made a valid request; and (iv) making the appropriate user selection.

Another type of interface involves sound localization. Here, two or more microphones are used to determine the direction from which the sound is coming from (based on the time of arrival of the sound at the two microphones). If the sound is coming from the right side of the device, computer, or kiosk, then the right option is selected. If the sound is coming from the left side of the device, computer, or kiosk, then the left option is selected. A similar selection criterion can be employed for up and down options as well. In the case of up-down and left-right motions, a minimum of three microphones would be needed, which based on their geometric positions perform sound localization in a two-dimensional space.

Hair Transformation

Figure 4:
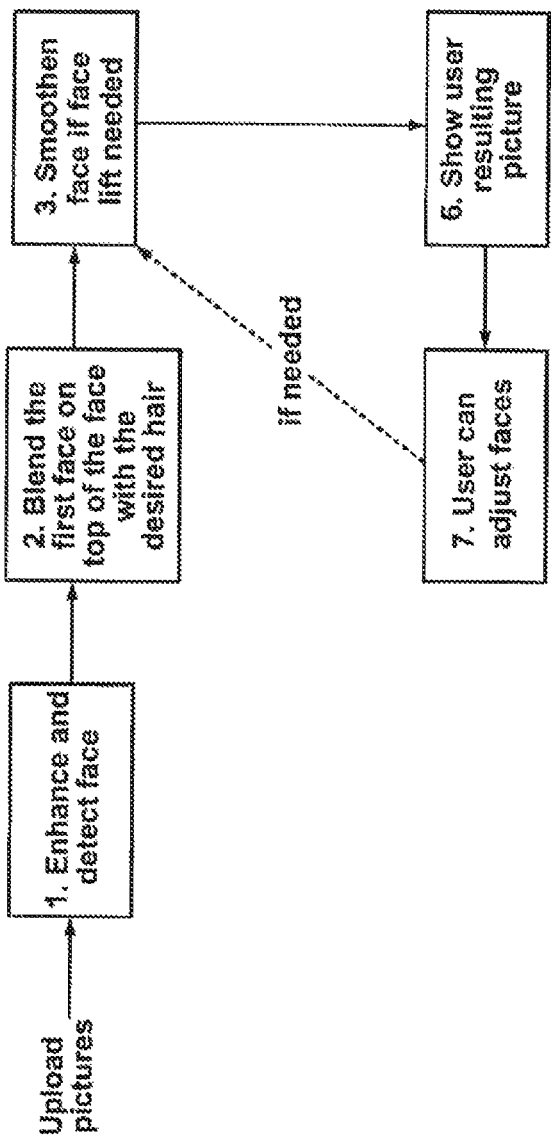
FIG. 4 illustrates a flow chart of method steps of a hair transformation aspect of the present invention.

Another aspect of the present invention is a hair transformation or restyling technique. In one aspect of the present invention, this feature is part of the face modification system of the present invention. Hair transformation and restyling is also achieved in a manner similar to the facelift. This is accomplished by extracting the face (after the user requested modifications are performed) and blending it on top of the face in a photo that contains the desired hair. In order to improve the effect, the size of the blended faces should be slightly (e.g., 10 to 20%) larger than the actual size of the faces to yield the best hair restyling result. Also, the bottom of the virtually transplanted face should be extended (e.g., 30 to 100% of the face height) in order to capture the neck, jaw, and chin structure of the desired face in the new photo. Once the hair has been restyled, the user can fine tune the results by adjusting the face size and locations in either photo and repeating this procedure. The basic method for the automatic hair transformation and restyling is depleted in FIG. 4.

Eyebrow Modification

By using the knowledge about the location of the eyes of a face, the location of the eyebrow can be assumed to be directly above the eye. This allows the eyebrows of one photo to be placed in the place of the eyebrow of a second photo, as follows:

1. The faces in each photo are detected, manually or automatically, and enhanced by performing a partial histogram equalization.
2. The features of the face including the eyes are localized automatically or semi-automatically.
3. If the user has elected to do so, the desired eyebrow box, defined as the box directly on top of the eye, belonging to the first photo is blended on top of the eyebrow box belonging to the second photo. This blending is performed as before, when a blending mask being used to define the amount of the original eyebrow, the desired eyebrow, and the recolored and desired eyebrow.

As described above, user adjustments of the feature boxes can be allowed to fine tune the locations of the features. In the case of the eyebrows, moving the eye box will adjust the locations from which eyebrows are extracted and where eyebrows are placed.

Utilization for Custom Advertisement

When the user has selected certain operations such as hair change or facelift, the system can utilize this information to get a sense of what type of information the user is interested in, and then to provide custom advertising. For example, if a person uploads a photo and then requests a hair change operation, the system can show hair stylist advertising on the results page. The geographic location information of the user along with the custom operation request can be used to further narrow the range of products and services that the user would be interested in. Custom advertisements in this scenario would work as follows:

1. The user uploads one or more photos and requests a set of operations to be performed on these photos.
2. The system performs the requested operation, and returns the resulting image along with the facial feature locations to the user. Along with this information, the system also sends an advertisement that is custom tailored towards the geographical location of the user, the requested operation, and/or any other customization information that may able available about the user.
3. If the user clicks on the advertisement either they will be directed to a target website of Internet destination, or to a custom page with further information about the specific operation and the advertisers.

Custom advertisements can also be delivered in mobile and email applications where the image and the necessary information is sent by the user to the MODIFACE email/server (via email, text messaging, or other means), the necessary operations are performed by MODIFACE, and emailed/sent back to the user or a destination specified by them. Along with the result that is sent back, a set of advertisements custom tailored to the geographical area, requested operation, and/or any other custom information about the user will also be sent.

For example, if a user sends an image to MODIFACE through email requesting for a facelift operation, MODI-FACE would send back the resulting face-lifted image along with advertisements front dermatologists, skin specialists, and/or cosmetic products that are customized and relevant to the user. A similar procedure would occur for selective facelift and face operations.

Utilization within a Social Network

Another aspect of the present invention is the definition of a web-enabled social network. A social network generally consists of an online site that allows users to create accounts and login, to select and add others as friends, and in accordance with the present invention to upload photos or photo modification results to their accounts. They can also view public photos (all photos uploaded or modified by users can be either public or private) of their friends or others on this social network. They can also comment on their own profile, or their own photos, or those of their friends. Finally, they can select any of their photos to be included as a "celebrity" photo which others can use for the basis of their own face modifications. Either creating an account or the act of make a personal photo a "celebrity" photo can be monetized through a user charge or through online advertisements that target the specific actions and requests of the user.

Figure 5:
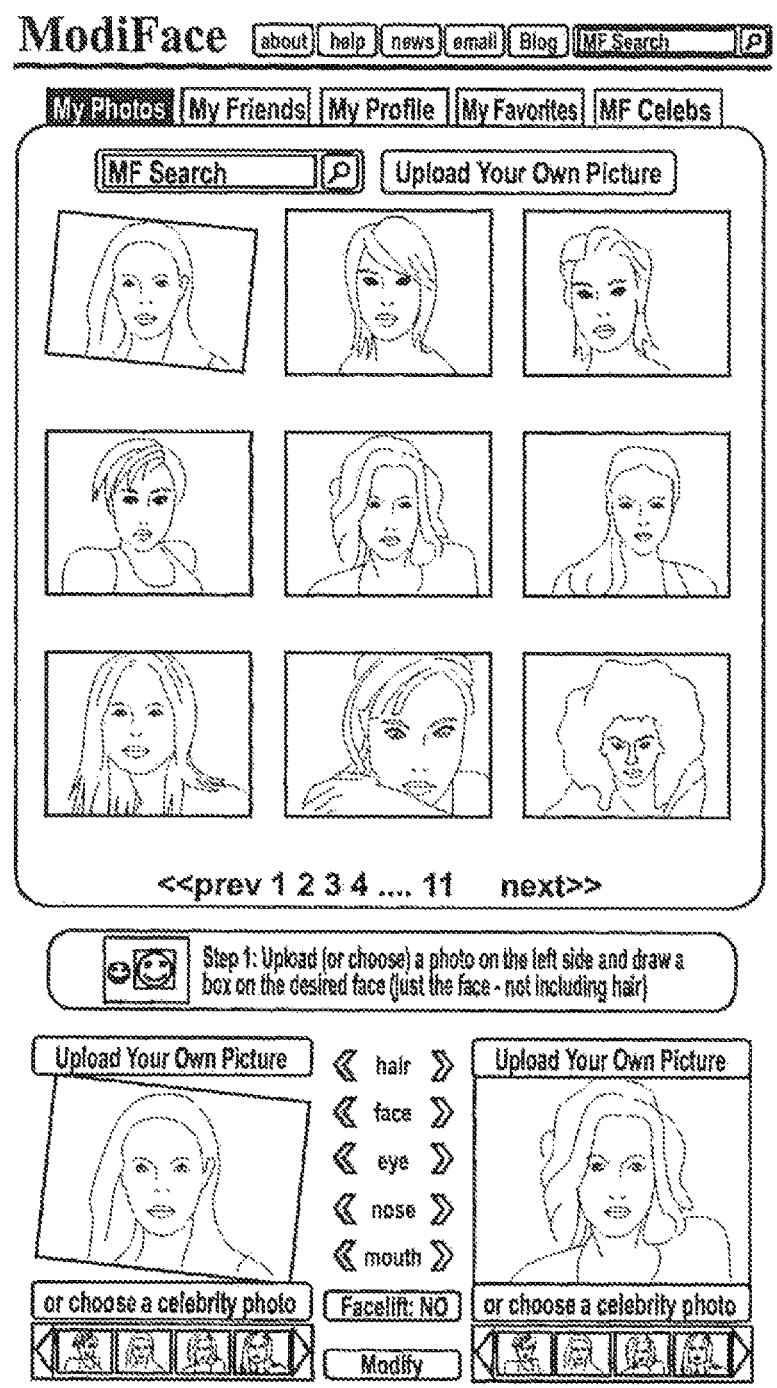
FIG. 5 illustrates a further interface for the system of the present invention, in accordance with one particular embodiment of the present invention.
Figure 7:
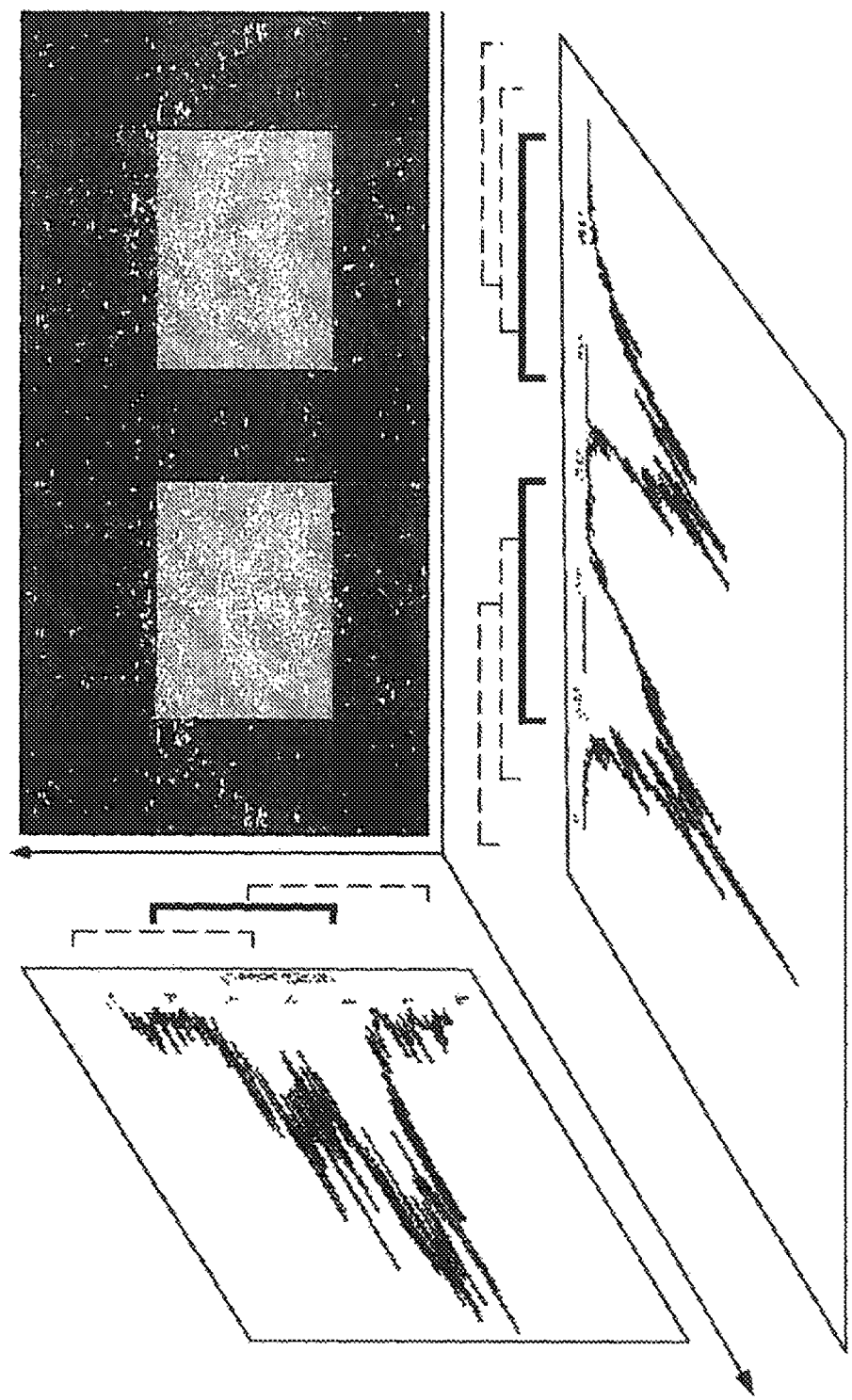

An example of an interface for the face modification social network is illustrated in FIG. 5. As shown therein, a relatively large image selection area is provided, in this case operable to display 9 images, and with controls to allow a user to flip between different "pages" of images. Towards the bottom of the screen a MODIFACE image modification, area is provided, with similar controls as shown in FIG. 2 (i.e., hair, face, etc.). However in this case there is also provided a scrolling image bar to allow the user to easily select images to modify.

Dynamic Images

Another application of the present invention is that of dynamic images. Currently, an image for Internet applications is a static file stored on a server. The present invention is operable to generate dynamic images of a person's face, such that certain elements of the image changes on a monthly, weekly, daily, hourly, or any other time-based or request-based changing schedule.

For example, a user may upload their own photo and they would get a link to a version of their photo that every hour (or over some other time interval) would include their face with a different hair style. The target hair styles, in this example, are chosen either from a celebrity/model list specified by the user or from all the celebrity image collections available to the invention. The steps for obtaining dynamic images would be as follows: (i) a user uploads a photo and selects a set of celebrity/model photos with which to replace features; (ii) the user selects the features to be changed (i.e. face, facial features, hair, etc.); (iii) the user selects a schedule for changes (i.e. weekly, monthly, daily, per download, etc.); (iv) the user is given a URL to an image file stored on the server which is modified based on the user entered parameters and schedule; and (v) the user embeds their image, using the generated URL, in their own site, in other sites, or in any other application.

Three Dimensional Face Reorientation

In situations where the target and/or desired face are tilted to one direction or rotated, the modified face will not look natural. The way to resolve this issue is by performing (optionally, only if a user requests so) a three dimensional face reorientation or correction.

Figure 20:
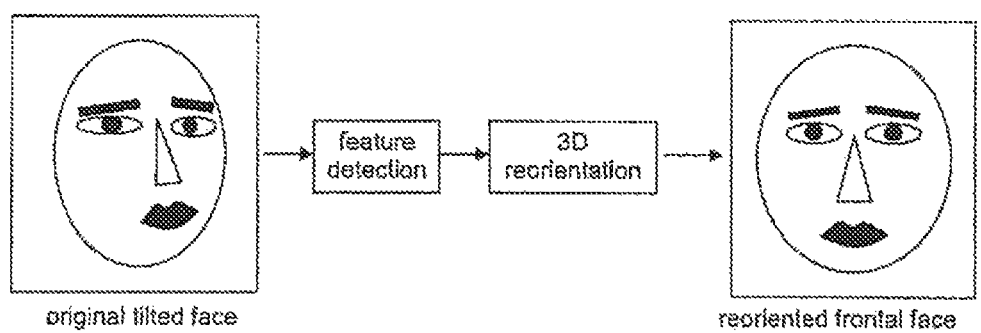
FIG. 20 illustrates the three dimensional face reorientation process.

It is assumed that both the final reoriented face and the original face lie on two different two-dimensional planes in three-dimensional space. The goal is to shift one plane to become horizontal to the look direction of the camera with which the photo was taken. FIG. 20 former illustrates this process.

A two-dimensional plane in three-dimensional space can be projected onto another plane according to the following algebraic formula:

$$\begin{bmatrix} x \\ y \\ 1 \end{bmatrix} = P \cdot \begin{bmatrix} X \\ Y \\ 1 \end{bmatrix}$$

Where (x,y) are a point on the first plane, (X,Y) are a point on the second plane, and P is a 3 by 3 matrix which contains the projective transformation parameters.

When we have located the left eye, the right eye, and lips, we obtain a set of coordinates on the face plane (here, we are assuming that the face is in fact just a plane), as follows:

Lip location=(mx,my)

Left eye location=(lx,ly)

Right eye location=(rx,ry)

We also have the ideal location of the facial features on a frontal face. This ideal location will be denoted as follows:

Ideal lip location=(Mx,My)

Ideal left eye location=(Lx,Ly)

Ideal right eye location=(Rx,Ry)

The goal is to project the original face plane onto the ideal face plane, as follows:

$$\begin{bmatrix} mx & lx & rx \\ my & ly & ry \\ 1 & 1 & 1 \end{bmatrix} = P \cdot \begin{bmatrix} Mx & Lx & Rx \\ My & Ly & Ry \\ 1 & 1 & 1 \end{bmatrix}$$

Three points on each plane are enough to find the project transformation between the plans, as follows:

$$P = \begin{bmatrix} mx & lx & rx \\ my & ly & ry \\ 1 & 1 & 1 \end{bmatrix} \cdot \begin{bmatrix} Mx & Lx & Rx \\ My & Ly & Ry \\ 1 & 1 & 1 \end{bmatrix}^{-1}$$

One the projection matrix P is found, it is applied to every point on the image in order to result in a re-oriented face. The projected face and feature locations are also determined through this transformation.

Iterative Face and Facial Feature Detection

In order to improve the results of face detection, and to make the face detection more reliable and consistent, an iterative approach is used to automatically check the validity of a detected face, as follows:

1. For each detected face, a new face score is computed, where this face score is a multiplication of the original face score and a feature score.

2. The feature scores are a multiplication of a parameter that measures the deviation-from-norm of the feature positions and individual validity metrics (including gradient magnitude symmetry) for the features.

3. If the facescore, featurescore, or their multiplication, is below a preset threshold, the face detection is performed again to find another region within the image that has the maximum facescore*featurescore.

In other words, the feature likelihoods are included in the face score calculations. Another benefit of this approach is that by detecting features at the face detection stage, it is possible to compensate for tilts and rotations easily based on the locations of the features.

Facelift

This section outlines in detail the procedure for the facelift operation. For the facelift operations, the following steps are performed:

1. The facial features (eyes, nose, and lips) are detected and extracted (i.e. copies are made of these original features).

2. The face is 'lifted' by smoothing it, either selectively to give the appearance of specific operations, or in entirety with uniform smoothing in the middle of the face and less smoothing around the edges of the face.

3. The original features are blended back onto the smoothed/lifted face

Figure 21:
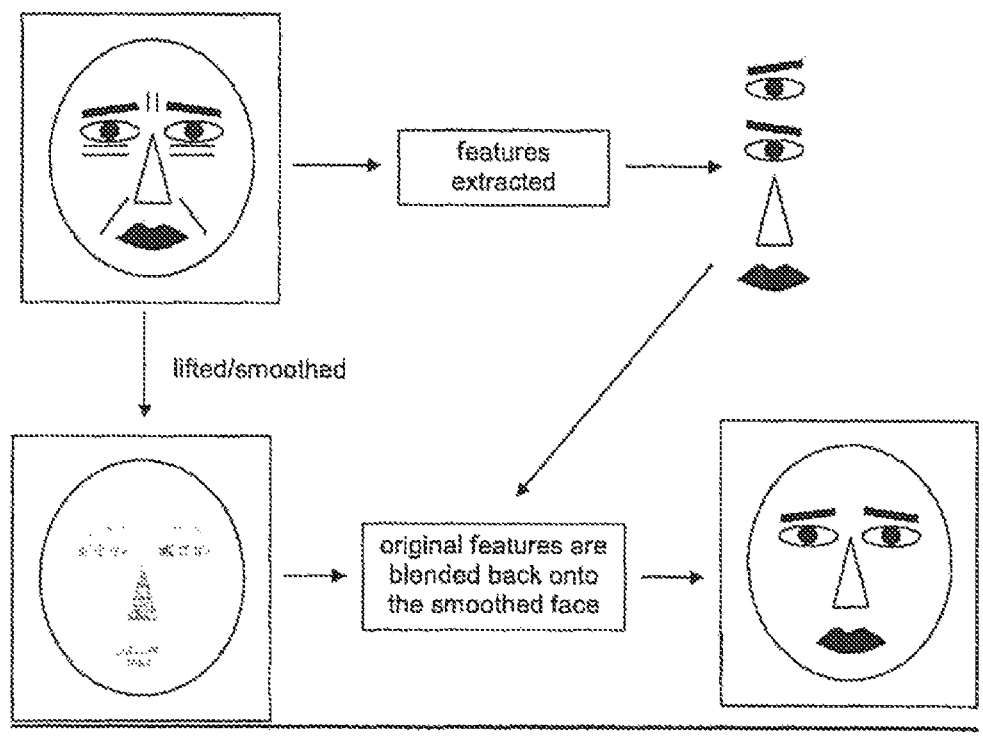
FIG. 21 illustrates the facelift operation process.

FIG. 21 illustrates the steps followed for the facelift process.

Selective Automated Facelift

The invention can also be utilized for visualizing the effects of a detailed or selective facelift operation or plurality of operations. A user can request selective partial facelifts, aside from a full facelift which would operate on the entire face. For example, a user could be shown an image of a template face or the user face, and the user could then select which parts of the face should undergo plastic surgery. This particular process relies on the methods described above. The steps involved with this process are as follows:

1. The system automatically detects the face of the person in a user uploaded or selected photo.

2. The system detects the features (eyes, lips, nose) within the face in order to get bearings on the face.

3. The user selects either a full facelift option, or a subset of partial options including but not limited to forehead lifts, eyebrow lifts, bellow eye lifts, inter-brow lifts, outer cheek lifts, inner cheek lifts, lip enhancement and lip lifts, as well as jaw restoration and jaw lifts.

4. Based on the user selected partial operations, the system performs the operation as follows:

a. The system first extracts the face features (eyes, lips, nose);

b. The system performs the selective surgery visualizations by either smoothing (convolving with a two-dimensional smoothing filter) the specific region or adjusting its size (for example, in the case of a brow lift or lip enhancement, the vertical dimensions of the eyebrows or lips are increased in order to give the impression of feature adjustment); and c. The extracted features are blended back onto the face, either at their original size or slightly adjusted in size in order to give the impression of an adjustment.

Figure 14:
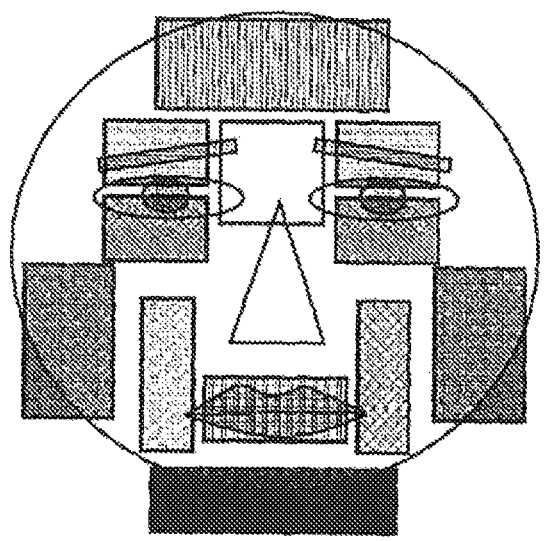
FIG. 14 illustrates the modifications available for a selective automated facelift.

An example of the possible modifications available for the selective automated facelifts is shown in FIG. 14.

An alternative realization of a selective facial lift and facial augmentation system is described below, which consists of a user uploading a photo to a computer server and the system automatically detecting the face, and allowing for user refinement of this face, followed by the user selection of a set of automatic facial operations (such as below-eye lift, forehead lift, mid-brow lift, eyebrow lift, inner cheek lift, outer cheek lift, chin restoration, lip augmentation) and operation strengths (none, subtle, moderate, and max). The user then selects a "Show Me" button or equivalent which initiates the processing of the user uploaded image automatically according to the user operation specification, showing the resulting image once the processing is complete.

Figure 15:
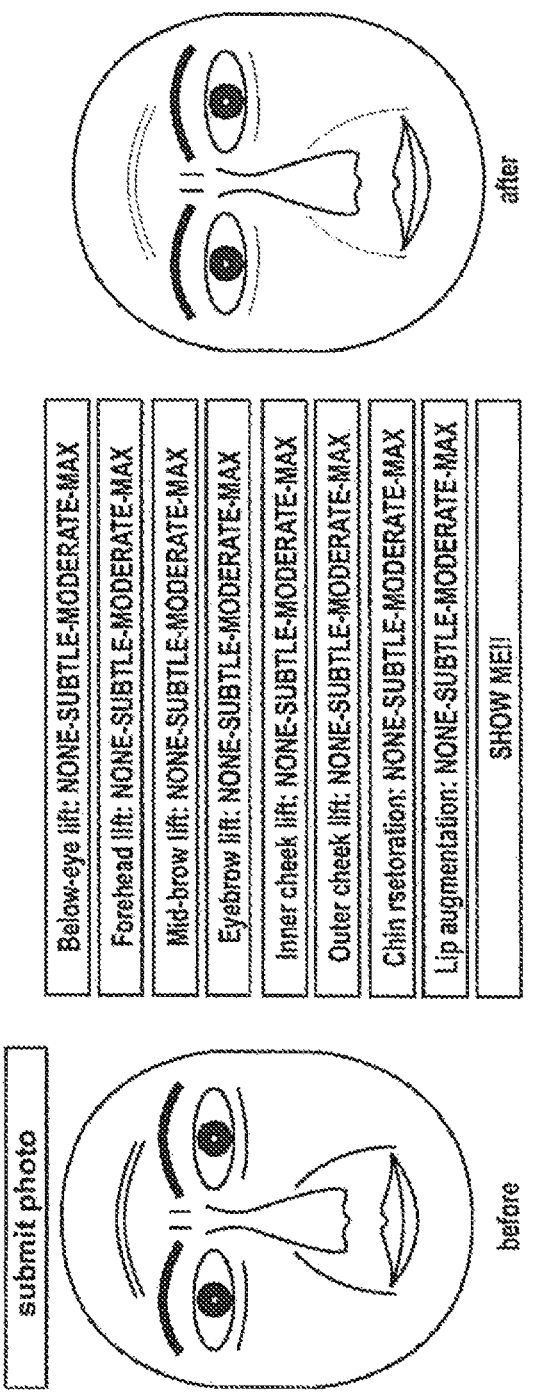
FIG. 15 illustrates the interface for a selective automated facelift.

An example of the interface for a selective automated facelift is shown in FIG. 15.

Details of Selective Face Modification Procedures

The following outlines the details of the specific facial modification procedures. For the procedures, the first step is generally to take an image I(x,y) submitted by the user on a website, sent by a mobile phone, or other means, and to compute (1) the location of the face, and (2) to extract the facial sub-image to form the face image F(x,y). Then as previously described in FIG. 1, the face image is smoothed by convolving it with a smoothing filter, as follows:

$$\text{Smoothed face} = S(x,y) = F(x,y) * Q(x,y)$$

Where '*' denotes a two dimensional convolution operation and Q(x,y) is a smoothing/averaging mask.

Once the smoothed face is obtained through the above filtering procedure, the left eye, right eye, nose, and lip sub images are also found in the original face image F(x,y) using the approach described previously in this disclosure. The sub images are denoted as LE(x,y), RE(x,y), N(x,y), and L(x,y), in order to denote the left eye, right eye, nose, and lip sub images respectively.

One or more of the specific facial modification operations are then performed using the above sub images. As explained earlier the facial modification operations are not exhaustive, and others as possible. The specific operations described herein are: (i) below-eye lift, (ii) forehead lift, (iii) mid-brow lift, (iv) inner cheek lift, (v) outer cheek lift, (vi) chin restoration, (vii) eyebrow lift, (viii) lip augmentation, and (ix) combination of the above.

Below-Eye Lift

A below-eye lift consists of lifting or removing the wrinkles directly around and below the eyes. This is achieved by:

1. Applying a below-eye mask to the original face image F(x,y) (applying implies pixel-by-pixel multiplication) (i.e. U(x,y)=F(x,y)×M(x,y)).
2. Applying the inverse (i.e. one minus) of the below-eye mask to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
(note: the strength factor 'a' is determined based on the strength of the operation. As an example, for operation: NONE, 'a' would be 1, for operation: SUBTLE, 'a' could be 0.8, for operation: MODERATE, 'a' could be 0.6, and for operation: MAX, 'a' could be 0.4.).
5. The left eye, right eye, nose, and lip sub images are blended on top of the processed face image Z(x,y) using the feature blending approach described previously in this disclosure.

Forehead Lift

A forehead lift consists of lifting or removing the wrinkles directly in the forehead area of the face. This is achieved by:

1. Applying a forehead mask to the original face image F(x,y) (applying implies pixel-by-pixel multiplication) (i.e. U(x,y)=F(x,y)×M(x,y)).
2. Applying the inverse (i.e. one minus) of the forehead mask to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
(note: the strength factor 'a' is determined based on the strength of the operation. As an example, for operation: NONE, 'a' would be 1, for operation: SUBTLE, 'a' could be 0.8, for operation: MODERATE, 'a' could be 0.6, and for operation: MAX, 'a' could be 0.4.)
5. The left eye, right eye, nose, and lip sub images are blended on top of the processed face image Z(x,y) using the feature blending approach described previously in this disclosure.

Mid-Brow Lift

The mid-brow lift consists of lifting or removing the wrinkles directly between the eyebrows. This is achieved by:

1. Applying a mid-brow mask to the original face image F(x,y) (applying implies pixel-by-pixel multiplication) (i.e. U(x,y)=F(x,y)×M(x,y)).
2. Applying the inverse (i.e. one minus) of the mid-brow mask to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
(note: the strength factor 'a' is determined based on the strength of the operation. As an example, for operation: NONE, 'a' would be 1, for operation: SUBTLE, 'a' could be 0.8, for operation: MODERATE, 'a' could be 0.6, and for operation: MAX, 'a' could be 0.4.).
5. The left eye, right eye, nose, and lip sub images are blended on top of the processed face image Z(x,y) using the feature blending approach described previously in this disclosure.

Inner Cheek Lift

An inner cheek lift consists of lifting the skin and removing the wrinkles directly around the lips and nose. This is achieved by:

1. Applying an inner cheek mask to the original face image F(x,y) (applying implies pixel-by-pixel multiplication) (i.e. U(x,y)=F(x,y)×M(x,y)).
2. Applying the inverse (i.e. one minus) of the inner cheek mask to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
(note: the strength factor 'a' is determined based on the strength of the operation. As an example, for operation: NONE, 'a' would be 1, for operation: SUBTLE, 'a' could be 0.8, for operation: MODERATE, 'a' could be 0.6, and for operation: MAX, 'a' could be 0.4.)

5. The left eye, right eye, nose, and lip sub images are blended on top of the processed face image Z(x,y) using the feature blending approach described previously in this disclosure.

Outer Cheek Lift

An outer cheek lift consists of lifting and removing the wrinkles in the outer cheeks area of the face, as well as removing imperfections as a result of aging. This is achieved by:

1. Applying an outer cheek mask to the original face image F(x,y) (applying implies pixel-by-pixel multiplication) (i.e. U(x,y)=F(x,y)×M(x,y)).
2. Applying the inverse (i.e. one minus) of the outer cheek mask to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
(note: the strength factor 'a' is determined based on the strength of the operation. As an example, for operation: NONE, 'a' would be 1, for operation: SUBTLE, 'a' could be 0.8, for operation: MODERATE, 'a' could be 0.6, and for operation: MAX, 'a' could be 0.4.)
5. The left eye, right eye, nose, and lip sub images are blended on top of the processed face image Z(x,y) using the feature blending approach described previously in this disclosure.

Chin Restoration

Chin restoration consists of lifting the skin and removing the signs of aging around the jaw and chin of the face. This is achieved by:

1. Applying a chin mask to the original face image F(x,y) (applying implies pixel-by-pixel multiplication) (i.e. U(x,y)=F(x,y)×M(x,y)).
2. Applying the inverse (i.e. one minus) of the chin mask to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
(note: the strength factor 'a' is determined based on the strength of the operation. As an example, for operation: NONE, 'a' would be 1, for operation: SUBTLE, 'a' could be 0.8, for operation: MODERATE, 'a' could be 0.6, and for operation: MAX, 'a' could be 0.4.)
5. The left eye, right eye, nose, and lip sub images are blended on top of the processed face image Z(x,y) using the feature blending approach described previously in this disclosure.

Eyebrow Lift

An eyebrow lift consists of lifting the eyebrows in order to reduce and remove the signs of aging around the eyebrows. This is achieved by:

1. Extending the left eye and right eye locations to cover the eyebrows of the face.
2. Stretching the extended left and right eye sub images based on the strength factor of the operation (i.e. vertically scaling the left and right sub images by a factor 'a').
(note: the strength factor 'a' is determined based on the strength of the operation. As an example, for operation: NONE, 'a' would be 1, for operation: SUBTLE, 'a' could be 1.05, for operation: MODERATE, 'a' could be 1.1, and for operation: MAX, 'a' could be 0.15.)
3. The scaled left eye and scaled right eye sub images are blended on top of the original face F(x,y) using the feature blending approach described previously in this disclosure.

Lip Augmentation

Lip augmentation consists of lifting the lips in order to reduce and remove the signs of aging around the lips. This is achieved by:

1. Stretching the lip location sub image based on the strength factor of the operation (i.e. vertically scaling the left and right sub images by a factor 'a').
(note: the strength factor 'a' is determined based on the strength of the operation. As an example, for operation: NONE, 'a' would be 1, for operation: SUBTLE, 'a' could be 1.05, for operation: MODERATE, 'a' could be 1.1, and for operation: MAX, 'a' could be 0.15.)
2. The scaled lip sub image is blended on top of the original face F(x,y) using the feature blending approach described previously in this disclosure.

Combination of the Above

The above approaches can be combined by repeatedly applying each operation, using possibly different strength factors, on a face. Here, for example, the first operation is performed on the original face, following by another operation being performed on the result of the first operation, and so forth. The end result is an automatic system for facelifting and face perfecting which uses the guidelines of a user to perform specific facial operations.

It should be understood that the image modifications that replicate cosmetic procedures, as described above (i.e. brow lifts, mid-brow lifts, forehead lifts and enhancement, under-eye and near-eye skin lifts and enhancements, inner cheek lifts and enhancement, outer cheek lifts and enhancement, lip enhancement and augmentation, jaw/chin enhancement and restoration or other facial and/or cosmetic operation), can be applied to digital images of a face to varying degrees. In one particular aspect of the present invention, a user can modify the "strength" levels of these particular image modifications, for example, by selecting (using a suitable graphic user interface) "no operation", "subtle operation", "moderate operation" or "maximum operation". The result of the image modification, i.e. the image of the face smoothed, enhanced or augmented in accordance with the mentioned procedures can be displayed or otherwise made available to the user. For example, the modified image can be displayed on a computer or communication device, communicated via the communication network as a download, email communication or other communication.

Fusion Based Detection Approach

As mentioned above, the present invention contemplates use of prior art face detection techniques. In another aspect of the present invention, a "fusion-based" face detection method is provided. Specifically, a method is disclosed for face detection which involves fusion of a plurality of simple face detector techniques described below to provide a face detection technique with improved characteristics.

As shown in FIG. 11a, a face search inside a user submitted image using starts with a large box with the height to width ratio being 4 to 3, and with the width being 60% of the image width, for example. The box is moved to all locations inside the image one pixel at a time for greatest accuracy (this can be improved for further efficiency). After the entire image has been searched, the width of the box is decreased (again one pixel at a time) with the height to width ratio remaining fixed at 4 to 3. The progression is depicted in FIG. 11a, FIG. 11b and FIG. 11c starting with a search over the entire image with a large face box, and continuing with smaller face boxes until a suitable hit or a minimum face box threshold is reached.

face box from the middle and taking the average of the pairwise square difference of the points inside the box that overlap, as shown in FIG. 12.

The motivation here is that if the box is perfectly symmetrical in the vertical axis running through the middle of the box, then it will have the smallest mean square difference. In other words, this is a measure of horizontal symmetry of the current face box.

For the actual metric, a constant is optionally added to the mean square difference and invert, so that a higher metric is indicative of greater symmetry. The final symmetry metric is:

$$F_{sym}(x_0, y_0, W, H) = (1 + E[|\Psi(x, y) - \Psi(W + 2x_0 - x, y)|])^{-1}$$

$$\cong \left(1 + \frac{2}{HW} \sum_{x=x_0}^{x_0+W/2-1} \sum_{y=y_0}^{y_0+H-1} |\Psi(x, y) - \Psi(W + 2x_0 - x, y)|\right)^{-1}$$

For all box sixes and box locations, a face score is computed which corresponds to the likelihood of a face at that location. The box with the highest score is chosen as the face location and size estimate. This is similar to most known template-based face detection algorithms. Generally speaking, the most difficult and sensitive part of template-based face detection is the score computations.

Face Detection Metrics

I(x,y) will denote the original image at location (x,y). The content of each location are a 3-element vector of red, green, and blue components (i.e. RGB) for each pixel. $\Psi(x,y)$ will denote the gradient magnitude (in the vertical direction) of the image I(x,y), and consists of a non-negative value for each location (x,y). T(x,y) will be a binary template image used to fit a binary template to the face.

It should be understood that all face score metrics are a function of the location and size of the current box. The top left corner of this box is denoted as $(x_0, y_0)$, while the width and height of the box are denoted as W and H, respectively.

It should also be noted that for visual simplicity, we have used E to denote the expected value of a certain variable, where the expectation is usually performed over the x and y variables. This theoretical expectation is practically estimated as follows:

$$E[Z(x, y)] \cong c \cdot \sum_y \sum_x Z(x, y)$$

where Z(x,y) is some function of x and y, and where c is a normalization constant.

Several metric approaches are possible.
A Symmetry-Based (SYM) Face Detection Metric This approach is a mirror mean square error measure applied to the image gradient. It consists of folding the current B. Template Subtraction (TS) Face Detection Metric The template subtraction metric measures the degree to which the current face box resembles a face. It consists of applying a binary face template which is used to differentiate between the high gradient and the low gradient regions of a face.

A simple template (FIG. 13a) was utilized, though other choices (e.g., FIG. 13b) would yield similar results. These models were based on general characteristics of the face (i.e. drawn by the author in a matter of seconds), and were not in any way trained or optimized for the face detection task.

The template subtraction metric can be simply stated as the average gradient magnitude of the pixels corresponding to the white (1) template pixels, minus the average gradient magnitude of the pixels corresponding to the black (0) template pixels. In other words, the template subtraction metric can be defined as:

$$F_{TS}(x_0, y_0, W, H) = E[\Psi(x, y) | T(x, y) = 1] - E[\Psi(x, y) | T(x, y) = 0]$$

$$\cong \frac{\sum_{x=x_0}^{x_0+W-1} \sum_{y=y_0}^{y_0+H-1} \Psi(x, y) \cdot T(x, y)}{\sum_{x=x_0}^{x_0+W-1} \sum_{y=y_0}^{x_0+H-1} T(x, y)} - \frac{\sum_{x=x_0}^{x_0+W-1} \sum_{y=y_0}^{y_0+H-1} \Psi(x, y) \cdot (1 - T(x, y))}{\sum_{x=x_0}^{x_0+W-1} \sum_{y=y_0}^{y_0+H-1} (1 - T(x, y))}$$

C. Template Ratio (TR) Face Detection Metric

The template ratio, which is another template based metric, is the average gradient magnitude of the pixels corresponding to the white (1) pixels of the template divided by the sum of both the average gradient magnitude of the white (1) template pixels and the average gradient magnitude of the black (0) template pixels, as defined below:

$$F_{TR}(x_0, y_0, W, H) = \frac{E[\Psi(x, y) | T(x, y) = 1]}{E[\Psi(x, y) | T(x, y) = 1] + E[\Psi(x, y) | T(x, y) = 0]}$$

-continued $$\cong \left(1 + \frac{\left(\sum_{x=x_0}^{x_0+W-1}\sum_{y=y_0}^{y_0+H-1} T(x,y)\right) \cdot \sum_{x=x_0}^{x_0+W-1}\sum_{y=y_0}^{y_0+H-1} \Psi(x,y)\cdot(1-T(x,y))}{\left(\sum_{x=x_0}^{x_0+W-1}\sum_{y=y_0}^{y_0+H-1}(1-T(x,y))\right)\cdot \sum_{x=x_0}^{x_0+W-1}\sum_{y=y_0}^{y_0+H-1}\Psi(x,y)\cdot T(x,y)}\right)^{-1}$$

D. Skin-Detector-Based (SKIN) Face Detection Metric

A pixel skin detector was employed to find the skin-like regions inside the image using a known technique, and to use the amount of skin in each test patch as an indication of the likelihood of a face.

The pixel (x,y) of image I(x,y) is skin, or skin (I(x,y))=1, if the red (R), green (G), and blue (B) components of that pixel obey the following conditions, for example:

R>95 and G>40 and B>20 and R−G>15 and R>B, or
R>220 and G>210 and B>170 and |R−G|<=15 and R>B and G>B The skin-based face detection metric can thus be defined as:

$$F_{skin}(x_0, y_0, W, H) = E[\text{skin}(I(x,y))]$$

$$\cong \frac{1}{HW}\sum_{x=x_0}^{x_0+W-1}\sum_{y=y_0}^{y_0+H-1}\text{skin}(I(x,y))$$

E. Eye-Lip Total Symmetry (ELTS) Face Detection Metric

The ELTS metric measures the ratio of the sum of gradients in the top half of the face to the sum of gradients in the whole face, as defined below:

$$F_{ELTS}(x_0, y_0, W, H) = \frac{E[\Psi(x,y) | x, y \text{ in top half of face}]}{E[\Psi(x,y)]}$$

$$\cong \frac{\sum_{x=x_0}^{x_0+W-1}\sum_{y=y_0}^{y_0+H/2-1}\Psi(x,y)}{\sum_{x=x_0}^{x_0+W-1}\sum_{y=y_0}^{y_0+H-1}\Psi(x,y)}$$

Ideally, a face should have strong gradients around the eyes and the lips/nose, making the ideal ELTS measure at around 0.5. As a result, the following adjustment is done to the final ELTS measure:

$$\hat{F}_{ELTS}(.)=\min(F_{ELTS}(.), 1-F_{ELTS}(.))$$

F. Eye Total Symmetry (ETS) Face Detection Metric

Similar to the ELTS, the ETS measures the symmetry of the total gradients in the top half of the face. It is the ratio of the gradient sum in the top left quadrant of the face to the gradient sum of the top half of the face, as defined below:

$$F_{ETS}(x_0, y_0, W, H) = \frac{E[\Psi(x,y) | x, y \text{ in top left quadrant}]}{E[\Psi(x,y) | x, y \text{ in top half of face}]}$$

$$\cong \frac{\sum_{x=x_0}^{x_0+W/2-1}\sum_{y=y_0}^{y_0+H/2-1}\Psi(x,y)}{\sum_{x=x_0}^{x_0+W-1}\sum_{y=y_0}^{y_0+H/2-1}\Psi(x,y)}$$

As before, in an ideal case the ETS measure should be a 0.5. Consequently, the following adjustment is performed to the ETS measure to ensure that its maximum value is 0.5:

$$\hat{F}_{ETS}(.)=\min(F_{ETS}(.), 1-F_{ETS}(.))$$

G. Lip Total Symmetry (LTS) Face Detection Metric

Just like the ETS, the LTS measure the symmetry of the gradient sums in the bottom half of the image, as defined below:

$$F_{LTS}(x_0, y_0, W, H) = \frac{E[\Psi(x,y) | x, y \text{ in bottom left quadrant}]}{E[\Psi(x,y) | x, y \text{ in bottom half of face}]}$$

$$\cong \frac{\sum_{x=x_0}^{x_0+W/2-1}\sum_{y=y_0+H/2}^{y_0+H-1}\Psi(x,y)}{\sum_{x=x_0}^{x_0+W-1}\sum_{y=y_0+H/2}^{y_0+H-1}\Psi(x,y)}$$

As before we adjust the LTS such that its maximum and ideal value is 0.5, as follows:

$$\hat{F}_{LTS}(.)=\min(F_{LTS}(.), 1-F_{LTS}(.))$$

H. Fusion Face Detection Metric

It was determined that combination of the above parameters results in very reliable face detection results relative to the results achieved by prior art methods. The following combined detector is a fusion of five of the above metrics described above:

$$F_{fusion}(\cdot)=F_{skin}(\cdot)\cdot F_{sym}(\cdot)\cdot F_{TS}(\cdot)\cdot F_{TR}(\cdot)\cdot F_{ELTS}(\cdot)$$

The fusion face detection metric, while only utilizing five detectors in its face score calculation, utilizes other metrics for optimization, as described below.

Test

A face detection experiment was performed on a set of 30 faces. These faces were mostly frontal views without any rotation. Also, each image contained exactly one face. As a result, the reported results include only the detection rate, since ROC curves, number of false positives, and number of false negatives here are unnecessary. In essence, the number of false negatives (i.e. the missed faces) will be the same as the number of false positives (i.e. the incorrect face position estimates for the missed faces) and therefore approximately equal to 100% minus the detection rate.

The face detector approaches discussed above were tested based on their reliability and accuracy. Reliability was measured as the percentage of correctly detected faces (based on the manual markings of the face in each image). A face was deemed to be correctly detected if the left, top, right, and bottom boundaries of the detected face were all less than 10 pixels away from the boundaries of the manually marked faces.

Another measure, related to the accuracy of the detected faces, consisted of the root mean square error (RMSE) of the face box coordinates. This value was calculated as the square roof of the mean square distance error of the top-left corner of the face box plus the mean square distance error of the bottom-right corner of the face box. The RMSE was measured separately for the correctly detected faces and the incorrectly detected faces.

The table below summarizes the results of the experiment.

TABLE 1

Face detection rates for various face detectors using a set of 30 face images.

| Face Detection Algorithm | Detection Rate | RMSE for correct detections (in pixels) | RMSE for incorrect detections (in pixels) |
| --- | --- | --- | --- |
| Symmetry | 0% | N/A | 133.99 |
| Template Subtraction | 83.33% | 5.33 | 57.59 |
| Template Ratio | 33.33% | 4.70 | 139.15 |
| Skin Detector | 10% | 10.05 | 57.55 |
| Eye-Lip Total Symmetry | 0% | N/A | 92.82 |
| Eye Total Symmetry | 0% | N/A | 83.46 |
| Lip Total Symmetry | 0% | N/A | 93.00 |
| EigenFace-based | 23.33% | 5.03 | 42.48 |
| Convolutional Neural Networks | 86.67% | 8.00 | 23.23 |
| Fusion | 93.33% | 4.96 | 69.38 |

As shown, the fusion of the simple face detectors outperforms prior art algorithms. The only two errors that were made by the fused detector are shown in the figure below (as the rightmost images in the bottom row).

The described fusion detector has a high detection rate of any approach, but it also has a very low RMSE measure. It has a detection rate that is 10% higher than any of the simple approaches and almost 7% higher than the neural network based approach which was extensively trained.

Optimizations

The fusion of multiple detectors not only can improve the reliability and accuracy of the face detector but it can also improve its efficiency. By performing simple checks to test the validity of each test patch, further and more complicated computations can be avoided for non-face patches.

By running the face detectors on a variety of faces, it was determined that for correct face patches the following conditions are almost always met: $F_{skin}(.)>0.65$; $F_{TR}(.)>0.5$; $F_{ELTS}(.)>0.4$; $F_{ETS}(.)>0.4$; and $F_{LTS}(.)>0.4$.

As a result, at every point of the computation if the appropriate parameter did not surpass its corresponding condition, further computations on the current face box were skipped. This was done for a selective subset of the conditions as well as for all conditions combined, as shown in the table below. The timing data below is based on a GNU™ C implementation of the face detection algorithm running on an Intel™ P4 2.2 GHz processor with 1 GB RAM. All images where resized to a width of 100 prior to performing face detection.

TABLE 2

Performance of the fusion face detector with continuation conditions which reduce the detection time.

| Optimization | Average Execution Per Face Time | % Improvement |
| --- | --- | --- |
| None | 12.17 s | 0% |
| $F_{skin}(.)>0.65$ | 5.65 s | 54% |
| $F_{TR}(.)>0.5$ | 10.42 s | 14% |
| $F_{ELTS}(.)>0.4$ | 11.25 s | 8% |
| $F_{ETS}(.)>0.4$ | | |
| $F_{LTS}(.)>0.4$ | | |
| All of the above conditions | 4.92 s | 60% |

By avoided a costly search in regions where the likelihood of a face is small, the conditions above increase the speed of the face detection process by 60%.

With further optimizations, including searching every 2-4 (instead of 1) pixels depending on the box size, for example, the average execution time per image becomes slightly more than 1.5 s, which is in the range of acceptability for live web applications. A FPGA (Field Programmable Gate Array) implementation of the above algorithm is also possible, and it is estimated that the algorithm described above running on a single state-of-the-art FPGA will be able to handle 1000 face detection requests per second.

In addition to the test described above, several experiments were performed using a frontal face database consisting of 450 color images of 27 individuals in various lighting conditions. The fusion detector correctly detected 404 of the 450 images, without any training or pre-processing, which corresponds to a 90% detection rate.

Since many of the detection errors where due to poor lighting conditions, or the result of faces that were smaller than the smallest search box, ill-conditioned images were removed from the dataset and a second experiment involving 426 images was performed. The new detection rate was 404 out of 426 images, which corresponds to a 95% detection rate.

The modification utility (106) of the present invention is programmed in a manner know to those skilled in the art, depending on the nature of the various system implementation of the present invention, including those described above. In one particular embodiment of the modification utility (106), it includes an automatic face detection utility (using the fusion approach described above), a virtual facelift and selective facelift utility (described above), a feature detection utility (as described above), a feature replacement utility (as outlined above), as well as a software components in javascript/ajax/php/C/C++ for the web/email interface for the mentioned applications, as well for interfacing the web presence and email presence of the invention with the said utilities.

It will be appreciated by those skilled in the art that other variations of the embodiments described herein may also be practised without departing from the scope of the invention. The within disclosure discusses certain system components, software components, or other utilities, as means for illustrating the operation and implementation of the present invention. It should be understood that the present invention is not limited to particular software, system, or network architectures or configurations, or to specific allocations of resources or functionality as between particular system components, software components, or other utilities. It should be understood that one or more system components, software components, or other utilities, could be provided as a greater or lesser number of system components, software components, or other utilities. As discussed above, the modification utility of the present invention, or aspects thereof, could be pre-loaded on a computer, or pre-loaded on mobile devices. The functionality described can be provided based on numerous architectures for delivering functionality, including but not limited to a client-server architecture, web service architecture (with or without resident software components), and standalone computer systems. While add-on utilities have not been discussed, it would be obvious to a person skilled in the art that various add-on utilities can be included into or linked to the modification utility for example to include alternate face detection or facial feature detection functionality, and additional face modification features (such as additional smoothing, specific color blending techniques and the like). The present invention provides for certain automatic face modification techniques, and invoking user intervention in certain cases. The way in which user intervention is involved and processed, and the tools used for user intervention, can be modified without departing from the scope of the invention. For example, additional tools for enabling user directed face modification in addition to the automated face modification described in the present disclosure, are contemplated. The present invention is not limited to any particular software structure, including a modular structure. Furthermore, the present invention could be implemented on a variety of hardware structures including digital signal processors, Field Programmable Gate Arrays (FPGAs), or Very Large scale Integrated Circuits (VLSI).

What is claimed is:

1. A method, for modifying digital image comprising:
   (a) detecting a face in the digital image;
   (b) establishing one or more regions of interest in the face in the digital image;
   (c) detecting one or more features in the regions of interest in the face in the digital image, said one or more features including one or more facial features of interest and one or more other facial features, so that the one or more facial features of interest are located and the one or more other facial features are located based on proximity to the one or more facial features of interest;
   (d) isolating the one or more features in the one or more regions of interest in the face in the digital image, through detection of deviation of skin color by determining gradient magnitude
   (e) augmenting the face in the digit image by smoothing one or more selective regions in the face in the digital image; and
   (f) re-blending into the digital image the one or more features in the face in the digital image to produce one or more altered areas in the face in the digital image, to define a modified digital image.

2. The method of claim 1, further comprising the step of establishing the regions of interest in the face in the digital image by using a generic template.

3. The method of claim 2, further comprising the step of utilizing the generic template that is proportional in size to the face in the digital image.

4. The method of claim 2, further comprising the step of detecting the features in the regions of interest in the face in the digital image by calculating gradient intensities using one or more boxes in the generic template.

5. The method of claim 1, further comprising the step of detecting the face in the digital image and optionally the face in the modified digital image by using a fusion detection means.

6. The method of claim 5, further comprising the step of performing the fusion detection means consisting of one or more of the following: symmetry-based face detection; template subtraction face detection; template ratio face detection; skin-detector-based face detection; eye-lip total symmetry face detection; eye total symmetry face detection; and lip total symmetry face detection.

* * * * *